US011025694B2

(12) United States Patent
Kölhi et al.

(10) Patent No.: US 11,025,694 B2
(45) Date of Patent: Jun. 1, 2021

(54) ABR VIDEO WHITE SPOT COVERAGE SYSTEM AND METHOD

(71) Applicant: ERICSSON AB, Stockholm (SE)

(72) Inventors: Johan Kölhi, Vaxholm (SE); Michael Huber, Täby (SE); Chris Phillips, Hartwell, GA (US); Diomedes Kastanis, Sunnyvale, CA (US)

(73) Assignee: ERICSSON AB, Stockholm (SE)

( * ) Notice: Subject to any disclaimer, the term of this patent is extended or adjusted under 35 U.S.C. 154(b) by 154 days.

(21) Appl. No.: 15/706,448

(22) Filed: Sep. 15, 2017

(65) Prior Publication Data

US 2018/0007109 A1 Jan. 4, 2018

Related U.S. Application Data

(63) Continuation of application No. 14/200,491, filed on Mar. 7, 2014, now Pat. No. 9,813,474.

(51) Int. Cl.
| | |
|---|---|
| *H04L 29/06* | (2006.01) |
| *H04L 29/08* | (2006.01) |
| *H04W 4/029* | (2018.01) |
| *H04W 24/02* | (2009.01) |
| *H04N 21/2662* | (2011.01) |
| *H04N 21/41* | (2011.01) |
| *H04N 21/45* | (2011.01) |
| *H04N 21/6373* | (2011.01) |

(52) U.S. Cl.
CPC ........ *H04L 65/602* (2013.01); *H04L 65/4084* (2013.01); *H04L 65/80* (2013.01); *H04L 67/2847* (2013.01); *H04N 21/2662* (2013.01); *H04N 21/4126* (2013.01); *H04N 21/4524* (2013.01); *H04N 21/6373* (2013.01); *H04W 4/029* (2018.02); *H04W 24/02* (2013.01)

(58) Field of Classification Search
None
See application file for complete search history.

(56) References Cited

U.S. PATENT DOCUMENTS

| | | | | |
|---|---|---|---|---|
| 8,060,407 | B1 * | 11/2011 | Delker | G06Q 30/00 705/14.68 |
| 8,495,237 | B1 * | 7/2013 | Bilinski | H04L 65/1083 709/231 |

(Continued)

FOREIGN PATENT DOCUMENTS

| | | | | |
|---|---|---|---|---|
| CA | 2388746 A1 * | 5/2010 | | H04L 29/08 |
| EP | 2 073 486 A1 | 6/2009 | | |

(Continued)

*Primary Examiner* — Aaron N Strange
*Assistant Examiner* — Mohammad Yousuf A. Mian

(57) ABSTRACT

A scheme for managing ABR streaming of content in a wireless radio network environment that may have radio white spot areas. Upon determining that the wireless UE device executing an ABR client application is in a radio white spot area, the current ABR streaming session may be suspended at a particular segment. Thereafter, playback of other content locally cached at the wireless UE device may be commenced in lieu of the ABR media segments. When the wireless UE device exits the radio white spot area, the ABR streaming session may be resumed from a point adjacent to the particular segment where the ABR streaming session was suspended.

20 Claims, 18 Drawing Sheets

(56) References Cited

U.S. PATENT DOCUMENTS

| | | | |
|---|---|---|---|
| 8,831,591 B2* | 9/2014 | Kotecha | H04M 3/42 |
| | | | 455/423 |
| 9,066,115 B1* | 6/2015 | Cherry | H04N 21/23424 |
| 9,210,207 B2 | 12/2015 | Reynolds et al. | |
| 9,444,870 B2 | 9/2016 | Phillips et al. | |
| 9,455,932 B2 | 9/2016 | Phillips et al. | |
| 2007/0091920 A1 | 4/2007 | Harris et al. | |
| 2009/0070206 A1* | 3/2009 | Sengamedu | G06Q 10/0637 |
| | | | 705/14.73 |
| 2010/0287580 A1* | 11/2010 | Harding | G06Q 30/0247 |
| | | | 725/14 |
| 2011/0225417 A1 | 9/2011 | Maharajh et al. | |
| 2011/0238466 A1 | 9/2011 | Haumont et al. | |
| 2011/0296458 A1* | 12/2011 | Di Mattia | H04N 21/23655 |
| | | | 725/36 |
| 2012/0009890 A1* | 1/2012 | Curcio | H04L 29/06 |
| | | | 455/230 |
| 2012/0172033 A1* | 7/2012 | Hilton | G01S 19/14 |
| | | | 455/423 |
| 2013/0007223 A1 | 1/2013 | Luby et al. | |
| 2013/0166906 A1 | 6/2013 | Swaminathan et al. | |
| 2014/0095943 A1* | 4/2014 | Kohlenberg | H04W 4/029 |
| | | | 714/47.3 |
| 2014/0297881 A1* | 10/2014 | Shivadas | H04L 67/2861 |
| | | | 709/231 |
| 2014/0365675 A1 | 12/2014 | Bhardwaj et al. | |
| 2015/0019968 A1 | 1/2015 | Roberts et al. | |
| 2015/0026289 A1* | 1/2015 | Nordness | H04L 67/1097 |
| | | | 709/213 |
| 2015/0026749 A1 | 1/2015 | Bringuier et al. | |
| 2015/0085875 A1 | 3/2015 | Phillips et al. | |
| 2015/0229694 A1 | 8/2015 | Reynolds et al. | |
| 2015/0249622 A1 | 9/2015 | Phillips et al. | |

FOREIGN PATENT DOCUMENTS

| | | | |
|---|---|---|---|
| EP | 2 388 746 A1 | 11/2011 | |
| FR | 2073486 A1 * | 12/2007 | H04L 29/06 |
| WO | WO 2013/163448 A1 | 10/2013 | |

* cited by examiner

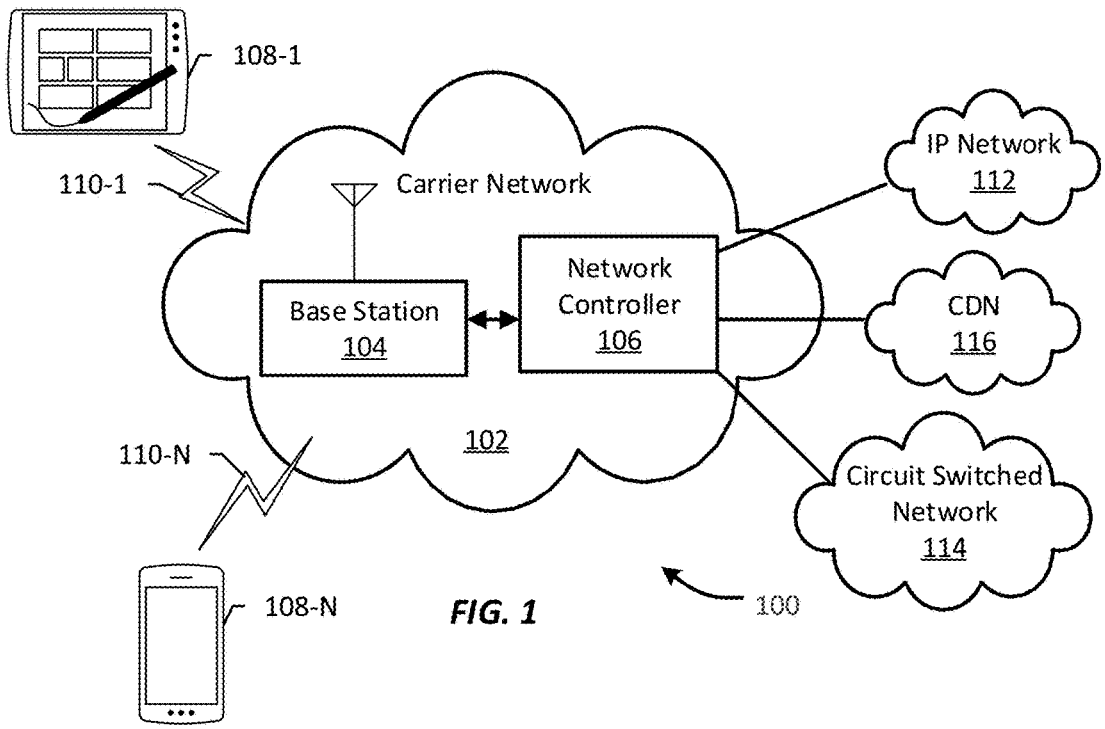
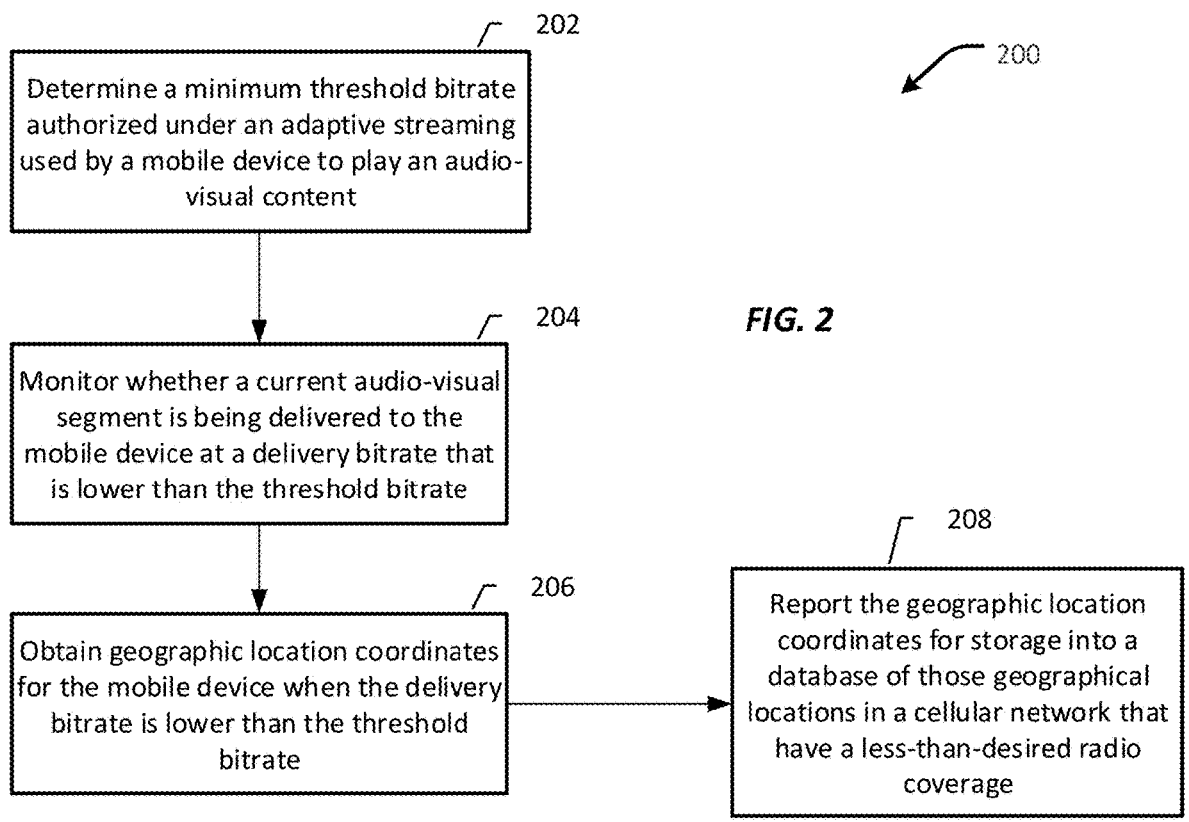
FIG. 1
FIG. 2

ABR VIDEO WHITE SPOT COVERAGE SYSTEM AND METHOD

REFERENCE TO RELATED APPLICATION(S)

This application is a Continuation of U.S. patent application Ser. No. 14/200,491, filed on Mar. 7, 2014 and discloses subject matter that is related to the subject matter of the following commonly-owned U.S. patent application(s): (i) "ADAPTIVE VIDEO WHITE SPOT LEARNING AND USER BANDWIDTH DELIVERY CONTROL SYSTEM" (Ericsson Ref. No.: P40959-US1), application Ser. No. 14/036,841, filed Sep. 25, 2013, in the name(s) of Christopher Phillips et al., now issued as U.S. Pat. No. 9,444,870; (ii) "CONFLICT DETECTION AND RESOLUTION IN AN ABR NETWORK" (Ericsson Ref. No.: P42221-US1), application Ser. No. 14/194,868, filed Mar. 3, 2014, in the name(s) of Christopher Phillips et al.; (iii) "CONFLICT DETECTION AND RESOLUTION IN AN ABR NETWORK USING CLIENT INTERACTIVITY" (Ericsson Ref. No.: P42767-US1), application Ser. No. 14/194,918, filed Mar. 3, 2014, in the name(s) of Christopher Phillips et al., now issued as U.S. Pat. No. 9,455,932; and (iv) "TIME-SENSITIVE CONTENT MANIPULATION IN ADAPTIVE STREAMING BUFFER" (Ericsson Ref. No.: P39531-US1), application Ser. No. 14/179,876, filed Feb. 13, 2014, in the name(s) of Jennifer Reynolds et al., now issued as U.S. Pat. No. 9,210,207, each of which is hereby incorporated by reference in its entirety.

FIELD OF THE DISCLOSURE

The present disclosure generally relates to communication networks. More particularly, and not by way of any limitation, the present disclosure is directed to a scheme for managing coverage in a wireless network environment configured to facilitate adaptive bitrate (ABR) streaming of content.

BACKGROUND

While mobile radio data network coverage is widespread, there may be areas where data coverage is low or where there is enough channel noise due to various factors such as, e.g., structures, interference, weather, etc. Although phone calls can generally overcome these issues by switching to a different network protocol, video delivered over data networks generally cannot. Accordingly, when consuming video via ABR streaming while traveling though an area of low coverage or poor signal quality, it is becomes necessary to manage a user's experience in a satisfactory manner.

SUMMARY

The present patent disclosure is broadly directed to systems, methods, apparatuses, devices, and associated non-transitory computer-readable media for managing ABR streaming sessions in a wireless network environment that may have potential video outage areas (also referred to herein as "white spots"). In one embodiment, a radio white spot coverage method for a wireless user equipment (UE) device engaged in an ABR streaming session is disclosed. The claimed embodiment comprises, inter alia, determining that the wireless UE device is in a radio white spot area (i.e., an area having poor video QoS); suspending and/or redirecting the current ABR streaming session at a particular segment; commencing play back of other content (i.e., alternative content) locally cached at the wireless UE device; determining that the wireless UE device is exiting the radio white spot area; and resuming the ABR streaming session from a point adjacent to the particular segment where the ABR streaming session was suspended.

In another aspect, an embodiment of a wireless UE device is disclosed, which comprises, inter alia, a cache for storing advertisements downloaded from a network entity while the wireless UE device is in radio coverage area having sufficient signal quality for supporting an overall bandwidth rate that is greater than a bandwidth rate necessary for facilitating an ABR streaming session of content encoded at a highest bitrate (e.g., as indicated in an ABR manifest file); an ABR buffer for storing media segments encoded at different bitrates pursuant to an ABR streaming session; an ABR client player configured to play back content out of the ABR buffer; and one or more processors coupled to a persistent memory having program instructions for controlling the ABR client player to play stored advertisements instead of media segments when the wireless UE device is in a radio white spot area.

In a still further aspect, an embodiment of a mobile-optimized ABR stream delivery server for facilitating ABR streaming sessions in a wireless radio network environment is disclosed. The claimed embodiment comprises, inter alia, one or more processors; an outage area request module operating under control of the one or more processors and configured to request anticipated video outage areas with respect to a wireless UE device, the anticipated video outage areas being based on the wireless UE device's current location and estimated direction of travel in the wireless radio network environment; an advertisement request module operating under control of the one or more processors for obtaining advertisement content from an advertisement server, wherein the advertisement content is relevant with respect to the anticipated video outage areas of the wireless UE device; and a delivery module operating under control of the one or more processors and configured to: effectuate delivery of ABR media segments encoded at different bitrates and associated manifest files to the wireless UE device pursuant to an ABR streaming session when the wireless UE device is not in a video outage area; effectuate delivery of the advertisement content to the wireless UE device for local storage thereat; and provide updated manifest files to the wireless UE device containing location pointers to the locally stored advertisements for playback by the wireless UE device's ABR client when the wireless UE device is in a video outage area.

In a related aspect, an embodiment of a method for pre-populating advertisements in a wireless radio network environment is disclosed. The claimed embodiment comprises, inter alia, determining that a manifest file associated with a wireless UE device's current ABR streaming session is unencrypted, wherein the wireless UE device is operative in or otherwise associated with a vehicle (i.e., a UE-carrying vehicle) traveling in a geographical area of the wireless radio network environment; parsing the manifest file for determining ABR profile bitrates used for encoding different media segments of the current ABR streaming session; determining that the wireless UE device's overall bandwidth exceeds a highest bitrate indicated in the manifest file; determining at least one of a location and direction of travel associated with the wireless UE device; determining that the wireless UE device is headed in a direction likely to encounter a video outage area; obtaining location coordinates of the video outage area and calculating an estimated time for traversing through the video outage area; obtaining advertisements relevant to the video outage area wherein the advertisements are estimated to last for a duration required to traverse the video outage area; and controlling delivery of the advertisements to the wireless UE device at a delivery rate based on an amount by which the wireless UE device's overall bandwidth exceeds the highest bitrate indicated in the manifest file of the current ABR streaming session.

In a further related aspect, an embodiment of a method operating at an optimized ABR stream delivery server is disclosed. The claimed embodiment comprises, inter alia, determining that a wireless UE device engaged in an ABR streaming session has entered a video outage area; updating a manifest file to reference at least one of an encoded notification message that the wireless UE device is out of video coverage and one or more advertisements stored locally within the wireless UE device; and transmitting the updated manifest file to the wireless UE device, whereupon an ABR client executing on the wireless UE device is operative to play back at least one of the encoded notification message and one or more advertisements while the wireless UE device is within the video outage area.

In a still further related aspect, an embodiment of a method operating at a wireless UE device is disclosed. The claimed embodiment comprises, inter alia, receiving or otherwise obtaining a notification that the wireless UE device is in a video outage area of a wireless radio network environment; continuing to play back media segments of the streaming session from an ABR buffer associated with the ABR client; determining whether the ABR buffer is drained; if so, saving a next media segment's existing state based on the streaming session's manifest; and commencing play back of one or more advertisements stored in a local cache of the wireless UE device.

In still further aspects, one or more embodiments of a non-transitory computer-readable medium containing computer-executable program instructions or code portions stored thereon are disclosed for performing one or more embodiments of the methods set forth above when executed by a processor entity of a network node, element, UE device, and the like, mutatis mutandis. Further features of the various embodiments are as claimed in the dependent claims.

Advantages of the present invention include, but not limited to, the ability to adapt to ad hoc issues such as, e.g., inclement weather interference, variable low radio quality, noise, etc. that may be encountered in a wireless ABR streaming environment, wherein there is usually enough bandwidth in normal conditions to both pre-cache advertisement clips as well as watch a video or other requested programming simulataneously. As will be seen hereinbelow, a video outage learning process accompanying one or more implementations is operative to provide a video QoS-aware location database with respect to an wireless network environment. Accordingly, advertisement segments and other alternative information pre-cached or pre-populated for users may be tailored to user demographic information and/or outage locations, which provides for an enriched user experience that not only feels less intrusive but also more informative. Because both pre-caching and streaming of ABR media segments may be facilitated when adequate bandwidth is available in the network, only minimal or no special implementational modifications are necessary with respect to deploying certain embodiments of the present disclosure in order to receive tailored advertisements. Further, as the advertisement clips typically need less data than normal video streaming, multiple advertisement clips can be cached once and played back several times, with the ability to update the clips relevant to newer video outage areas when needed. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIG. 1 depicts an example wireless network environment for facilitating ABR streaming according to one or more embodiments of the present patent application;

FIG. 2 depicts a flowchart of an example methodology for building a database of video outage areas (i.e., radio white spot areas) according to an embodiment for purposes of the present patent application;

DETAILED DESCRIPTION OF THE DRAWINGS

Figure 3A:
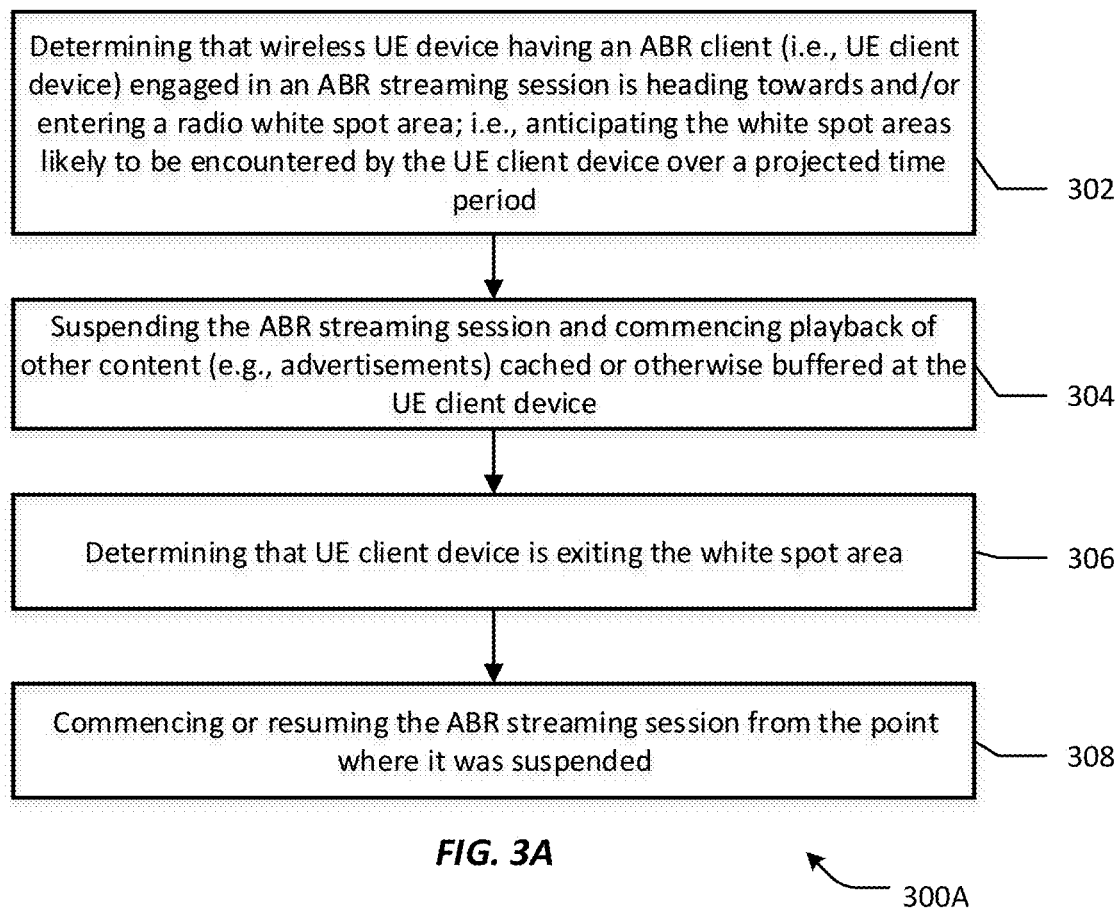
FIGS. 3A-3C depict flowcharts of various blocks, steps and/or acts that may be combined in one or more arrangements that illustrate one or more embodiments of the present patent disclosure for optimizing user experience while traversing a white spot area of a wireless network environment.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wireless radio network environment whereas other network elements may be disposed in a public packet-switched network infrastructure, including or otherwise involving suitable content delivery network (CDN) infrastructure. Accordingly, some network elements may comprise "multiple services network elements" that provide support for multiple network-based functions (e.g., A/V media management, session control, Quality of Service (QoS) policy enforcement, bandwidth scheduling management, subscriber/device policy and profile management, content provider priority policy management, streaming policy management, advertisement push policy management, and the like), in addition to providing support for multiple application services (e.g., data and multimedia applications). Subscriber end stations or client devices may comprise any device configured to execute, inter alia, a streaming client application (e.g., an ABR streaming client application) for receiving content from one or more content providers, e.g., via mobile telephony networks. Such client devices may therefore include portable laptops, netbooks, palm tops, tablets, mobile phones, smartphones, multimedia phones, Voice Over Internet Protocol (VOIP) phones, mobile/wireless user equipment, portable media players, portable gaming systems or consoles (such as the Wii®, Play Station 3®, etc.) and the like that may access or consume content/services provided over a content delivery network via a suitable high speed wireless connection for purposes of one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example wireless network environment 100 for facilitating ABR streaming according to one or more embodiments of the present patent application. A plurality of exemplary wireless or mobile devices or user equipment (UE) devices 108-1 to 108-N are shown as being operational in the wireless environment 100 comprising an exemplary mobile communication network or carrier network 102. In the discussion herein, the terms "wireless network," "mobile communication network," "carrier network", or terms of similar import may be used interchangeably to refer to a wireless communication network (e.g., a cellular network, a proprietary data communication network, a corporate-wide wireless network, etc.) that facilitates voice and/or data communications with different types of wireless mobile devices (e.g., devices 108-1 to 108-N). In one embodiment, such devices may be a User Equipment (UE) or a Mobile Station (MS) (also known by various analogous terms such as "mobile handset," "wireless handset," "mobile device," "mobile terminal," etc.) capable of receiving adaptively streamed/delivered audio-visual content from the network 102 and playing it using a local ABR client player executing thereon. In some other embodiments, wireless mobile devices may comprise portable gaming devices, electronic tablets, laptops equipped with suitable wireless modems, e-readers, and the like, as alluded to previously.

The wireless UE devices 108-1 to 108-N are shown to be in wireless communication (via respective radio links 110-1 to 110-N) with the wireless network 102 through one or more base stations, e.g., base station (BS) 104 (also interchangeably referred to herein as a "mobile communication network node" or simply a "node") of the network 102. The example base station 104 may provide radio interface (in the form of suitable Radio Frequency (RF) links depending on the particular mobile communications technology) to devices 108-1 to 108-N via appropriate antenna elements. By way of example, the base station 104 may comprise a base station in a Third Generation (3G) network, or an evolved Node-B (eNodeB or eNB) when the carrier network is a Third Generation Partnership Project's (3GPP) Long Term Evolution (LTE) network. In some example embodiments, the base station 104 may also include a site controller, an access point (AP), a radio tower, or any other type of radio interface device capable of operating in a wireless environment. In addition to providing air interface or wireless channel (e.g., as represented by wireless links 110-1 to 110-N) to the wireless UE devices, the communication node (or base station) 104 may also perform radio resource management (as, for example, in case of an eNodeB in an LTE system). In case of a 3G carrier network, example base station 104 may include functionalities of a 3G base station along with some or all functionalities of a 3G Radio Network Controller (RNC). Additionally, base station 104 may be part of an Access Network (AN) (not shown) portion of the carrier network 102, wherein the AN may be a 3GPP cellular AN or an International Mobile Telecommunication (IMT) Radio Access Network (RAN) such as, for example, a Universal Terrestrial Radio Access Network (UTRAN), an Evolved-UTRAN (E-UTRAN), a GSM/EDGE RAN (GERAN), a Worldwide Interoperability for Microwave Access (WiMAX) network, and the like.

Example carrier network 102 may include a network controller 106 coupled to the base station 104 for providing logical and control functions relative to, e.g., roaming support and/or terminal mobility management, subscriber account management, billing, etc., as well as accessing of external networks or communication entities and delivery of streamed A/V content from one or more content sources. By way of example, connectivity to other networks or infrastructures such as, for instance, the Internet 112, CDN 116 and a circuit-switched landline telephone network (i.e., a Public-Switched Telephone Network or PSTN) 114, is illustrated. In case of an LTE carrier network, network controller 106 may include some or all functionalities of an Access Gateway (AGW) or an Evolved Packet Core (EPC) node. In certain embodiments, such functionalities may comprise, for example, an IMT core network functionality or an ETSI TISPAN (European Telecommunications Standards Institute TIPHON (Telecommunications and Internet Protocol Harmonization over Networks) and SPAN (Services and Protocols for Advanced Networks)) core network functionality. Regardless of a particular implementation of the carrier network, base station 104 and/or network controller functionality 106 may be configured to facilitate, in conjunction with or independent of one or more external network entities and databases, a methodology for controlling delivery of ABR streaming sessions to wireless UE devices in potential video outage areas that may be encountered in the wireless network environment 100, as will be set forth in detail hereinbelow.

FIG. 2 depicts a flowchart of an example methodology 200 for building a database of video outage areas (i.e., radio white spot areas) according to an embodiment for purposes of the present patent application. As shown at block 202 in FIG. 2, a network entity (e.g., in the carrier network 102 or a subscriber policy management node associated with CDN 116 of FIG. 1) may initially determine a minimum threshold bitrate (e.g., for enforcing a QoS policy) authorized under an adaptive streaming technique used by a mobile device (e.g., wireless UE device 108-1) to play an audio/visual content file or program. The network entity may then monitor whether a current audio/visual segment is being delivered to the wireless UE device at a delivery bitrate that is lower than the threshold bitrate (block 204). When the delivery bitrate of the current streaming segment is determined to be lower than the threshold bitrate, the network entity may obtain the geographic location coordinates for the wireless UE device (block 206) because such reduced delivery bitrate may indicate a less than acceptable service, possibly due to various radio signal quality conditions, including a radio outage condition. Thereafter, the network entity may report those geographical location coordinates for storage into a database (block 208), which may be configured to maintain a dataset of geo-locations (e.g., in the form of location coordinates) with respect to the geographical area of the network 102 that have a less-than-desired radio coverage. Those skilled in the art will recognize that the dataset of video outage areas is not static and may not necessarily mean that there is a complete radio outage at the reported locations. Depending on variable signal parameters, improvements to the infrastructure, changes in the environmental and structural elements (e.g., buildings, towers, etc.) within the wireless network environment, and the like, a location database of potential white spot areas may be continually and/or dynamically updated as needed (i.e., by way of a learning process). Furthermore, white spot area databases and/or server systems hosting such databases may be provided with suitable application program interfaces or APIs that facilitate interaction with other network entities and services, e.g., including bandwidth control. Additional details regarding such techniques may be found in one or more of the following commonly owned co-pending U.S. patent application(s): (i) "ADAPTIVE VIDEO WHITE SPOT LEARNING AND USER BANDWIDTH DELIVERY CONTROL SYSTEM" (Ericsson Ref. No.: P40959-US1), application Ser. No. 14/036,841, filed Sep. 25, 2013, in the name(s) of Christopher Phillips et al., now issued as U.S. Pat. No. 9,444,870 (referred to hereinafter as the "Video White Spot Learning patent application"), cross-referenced hereinabove and hereby incorporated by reference herein.

Figure 3B:
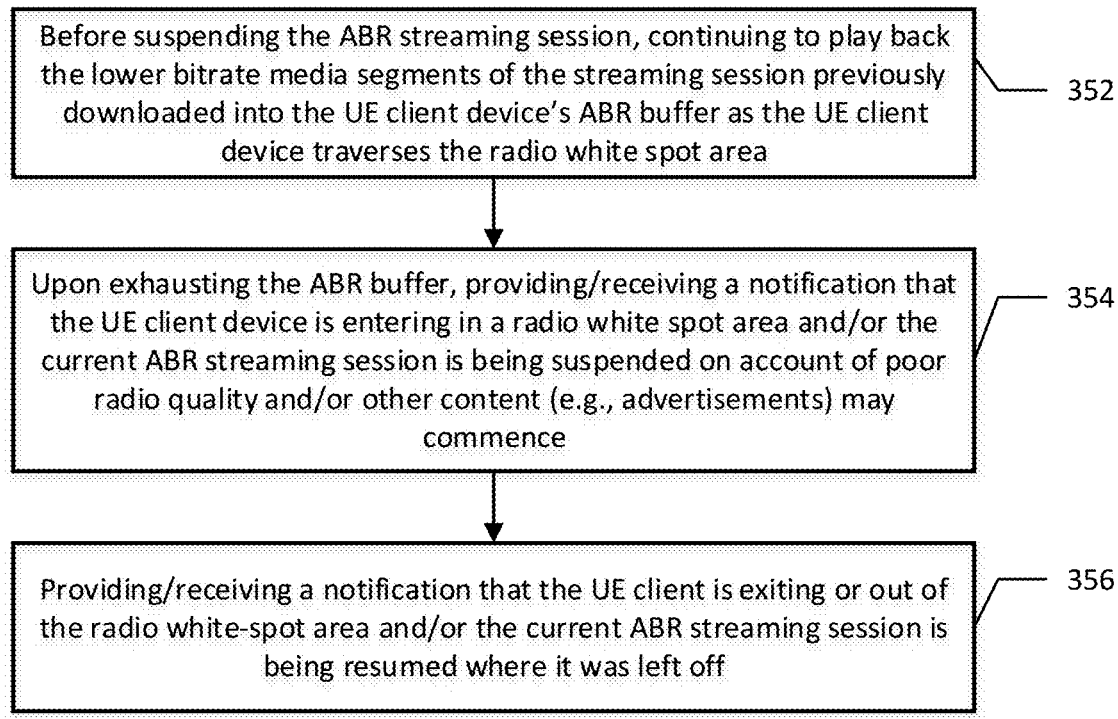
Figure 3C:
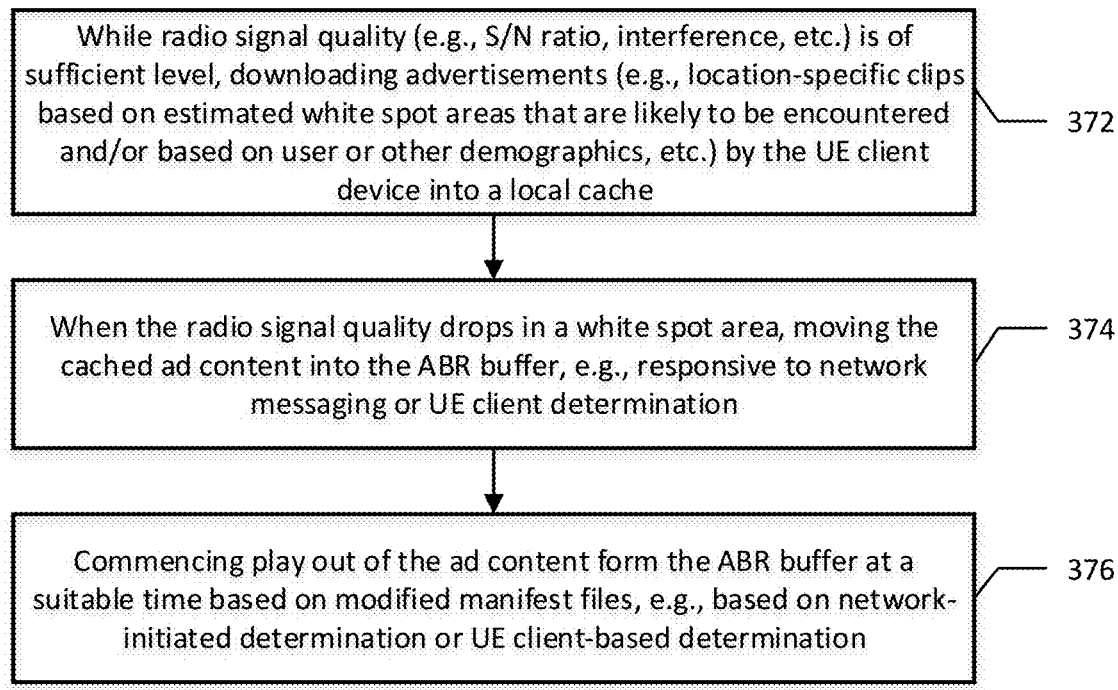

FIGS. 3A-3C depict flowcharts of various blocks, steps and/or acts that may be combined in one or more arrangements that illustrate one or more embodiments of the present patent disclosure for optimizing user experience while traversing a radio white spot area of a wireless network environment. Reference numeral 300A in FIG. 3A generally refers to a broad methodology for providing radio white spot coverage for a wireless UE device engaged in an ABR streaming session according to one embodiment. For purposes of the present patent application, the wireless UE device may be configured to receive or otherwise consume a variety of content via streaming sessions effectuated over a suitable wireless connection, which streaming sessions may at least partly involve delivery or distribution of convent via a delivery network such as CDN 116 coupled to the wireless network serving the wireless UE device regardless of whether the wireless network is a home network or a visited network. As one skilled in the art will appreciate, example CDN 116 may comprise an overlay network architected for high-performance streaming of a variety of digital assets or program assets as well as services (hereinafter referred to as "content") to subscribers, including wireless/mobile equipment users, using one or more Internet-based infrastructures, private/dedicated infrastructures or a combination thereof. In general, the terms "content", "content file", or "media segment" and the like as used in reference to at least some embodiments of the present patent disclosure may include digital assets and program assets such as any type of audio/video content or program segment, live or static (e.g., recorded over-the-air free network television (TV) shows or programs, pay TV broadcast programs via cable networks or satellite networks, free-to-air satellite TV shows, IPTV programs, etc.), Over-The-Top (OTT) and video-on-demand (VOD) or movie-on-demand (MOD) shows or programs, time-shifted TV (TSTV) content, as well as other content assets provided by content publishers, owners or providers, including but not limited to software files, executable computer code or programs, online electronic games, Internet radio shows/programs, entertainment programs, educational programs, movies, music video programs, and the like, that may be delivered using any known or heretofore unknown streaming technologies. By way of illustration, content delivered via the serving wireless network (e.g., carrier network 102) may be encoded using suitable ABR streaming techniques to support Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on.

In general, the overlay architecture of CDN 116 may include a multi-level, hierarchically-organized interconnected assembly of network servers for providing media pathways or "pipes" from one or more central distribution nodes to one or more levels of regional distribution nodes that are connected to one or more local edge servers and/or radio network entities configured to serve a plurality of end users or subscribers in respective serving location areas. In addition to such "distribution servers", CDN 116 may also include and/or interoperate with various network elements configured to effectuate request redirection or rerouting mechanisms as well as related back office systems or nodes such as operator/subscriber policy management systems, bandwidth scheduling systems, account/billing systems, and the like, that may be deployed as part of a streaming network back office infrastructure (not specifically shown in FIG. 1).

Continuing to refer to FIG. 3A, a determination may be made at block 302 that the wireless UE device including a suitable ABR client and currently engaged in an ABR streaming session is heading towards and/or entering a radio white spot area based on a variety of techniques for positioning/locating and estimating a travel direction of a mobile device known in the art. For example, such techniques may comprise positioning methods based on radio cell coverage, Global Positioning System (GPS), Assisted GPS (A-GPS), Global Navigation Satellite System (GLONASS), Galileo, or other satellite based systems/methods, or Time-Of-Arrival (TOA), Uplink Time Difference Of Arrival (UTDOA), Observed Time Difference Of Arrival (OTDOA), or Enhanced Observed Time Difference (E-OTD) methods. In general, additional description of the positioning methods in a cellular network may be found in such 3GPP Technical Specifications (TS) as, for example, the TS 36.305 (E-UTRAN; Stage 2 functional specification of UE positioning in E-UTRAN), the TS 25.305 (Stage 2 functional specification of UE positioning in UTRAN), and TS 43.059 (Functional stage 2 description of Location Services (LCS) in GERAN). Many of these positioning methods may be based on network triangulation, Wi-Fi positioning, and/or wireless UE device's internal sources such as accelerometers, position sensors, etc., in addition to utilizing speed/direction estimations of a vehicle in which the wireless UE device may be operating. Accordingly, given a set of current location coordinates of the wireless UE device (and/or the vehicle) as well as a speed/direction estimate associated therewith, it can be anticipated as to where and when the vehicle and its UE device (hereinafter, the terms "vehicle" and "wireless UE device" operating therein will be used somewhat interchangeably for purposes of the example embodiments unless otherwise expressly noted) will encounter radio white spots over a projected route and/or duration of time by querying a suitable video outage database.

After determining that the wireless UE device is in a radio white spot area, a further determination may be made to suspend, terminate or otherwise disable or redirect the current ABR streaming session of the wireless UE device (block 304). Such deactivation or redirection may take place immediately or at some other relevant point with respect to the media segments being streamed, e.g., upon completion of a current media segment. Further, the ABR client of the wireless UE device may be instructed to commence playback of other content locally cached or otherwise buffered at the wireless UE device while the ABR streaming session is in a deactivation/redirection mode. The locally available alternative content may comprise advertisements, weather reports, news clips, etc., that may be relevant with respect to (i) the video outage area that the wireless UE device is in; (ii) demographic information of the wireless UE device user; (iii) the user's estimated travel route passing through the video outage area; and/or some other user- or network-specified information identified for preloading, etc., in any combination thereof. The amount of such alternative content available for playback or play-out may be predetermined based on the estimated time it may take for the vehicle/UE device to traverse a particular video outage area. At some future time, based on determining that the wireless UE device is exiting the video outage area or lapse of a known estimate of time required to traverse the video outage area, the ABR streaming session may be (re)commenced or resumed from the point where it was suspended (e.g., from a media segment adjacent to the particular segment that was last played), as set forth at blocks 306 and 308.

Reference numeral 300B in FIG. 3B generally refers to at least a portion of additional features and associated blocks that may be added, replaced, or supplemented, either alone or in any combination, in respect of the white spot area coverage process 300A described above. As one skilled in the art will appreciate, ABR streaming techniques allow for streaming of content encoded at varying bitrates, depending upon, inter alia, network bandwidth conditions, client resources, radio signal quality, etc. For example, a user's bandwidth and processing capacity may be detected in real time, and the quality of video stream may be adjusted accordingly. Initially, source content is transcoded or otherwise encoded with different bit rates (e.g., multi-rate transcoding). For example, a particular content may be transcoded into five video files using variable bit rates, ranging from low to high bit rates. The particular content is therefore encoded as five different "versions" or "formats", wherein each bit rate is called a profile or representation. The encoded content is divided into fixed duration segments or chunks, which are typically between two and ten seconds in duration. Whereas shorter segments may reduce coding efficiency, larger segments may impact the adaptability to changes in network throughput, radio conditions, and/or fast changing client behavior. Regardless of the chunk size, the segments may be Group-of-Pictures (GOP)-aligned such that all encoding profiles have the same segments. A suitable Manifest File is created that describes the encoding rates and includes Universal Resource Locator (URL) pointers relative to the various segments of encoded content. In one implementation, the Manifest File (MF), a Delivery Format (DF) and means for conversion from/to existing File Formats (FF) and Transport Streams (TS) may be provided to a client device when a particular content is requested, which uses HTTP to fetch the encoded segments from the content provider network, provided there is no bandwidth conflict and/or radio signal deterioration. The received segments may be buffered, as needed, and decoded and played back (i.e., rendered) in sequence by the ABR client.

Accordingly, by virtue of the manifest file information, the ABR client is made aware of the available streams at different bitrates, and segments of the streams, whereby the client can switch between streaming the different encoded segments depending on available network resources. For example, when the network throughput has deteriorated, e.g., as a wireless UE device approaches a video outage area, the ABR client may find that the download speed for a currently-downloaded segment is lower than the bit rate (or, synonymously "bitrate") specified for that segment in the manifest file. In that event, the client may request that the next segment be at that lower bitrate. Similarly, if the client finds that the download speed of the currently-downloaded segment is greater than the manifest file-specified bitrate of the segment downloaded, then the client may request that next segments be at that higher bitrate. Therefore, it should be recognized that an ABR buffer may contain requested media segments at different video qualities (e.g., lower bitrate content having a lower quality versus higher bitrate content having a correspondingly higher quality). Accordingly, before suspending an ongoing ABR streaming session due to, for example, encountering a video outage area, a determination may be made to continue to play back the lower bitrate media segments that have been previously downloaded into the ABR buffer (block 352). Playback of such lower bitrate content may take place until the ABR buffer is completely exhausted or, if the buffer has stored progressively lower quality segments, upon reaching a certain minimum threshold quality acceptable to the user. Further, either upon exhausting the buffer or reaching the quality threshold, one or more notifications may be provided to the user that the wireless UE client device is entering an outage area and/or the quality is unacceptable. The notifications may also indicate that the current ABR streaming session is being suspended and alternative content (e.g., advertisements) may be played back instead (block 354). Similarly, when the wireless UE client device is exiting or out of a radio white spot, appropriate messages may be provided (block 356).

FIG. 3C depicts still further additional features and associated blocks that may be added, replaced, or supplemented, either alone or in any combination, in respect of the processes set forth in FIGS. 3A and 3B. Block 372 refers to features relating to pre-populating alternative content into a wireless UE device when the radio conditions of a wireless network permit. As illustrated, parameters such as signal-to-noise (S/N) ratio, interference levels, and other channel conditions may be monitored or determined to be such that the signal quality may be sufficiently high, thereby permitting streaming/downloading of alternative content, e.g., advertisements, from appropriate content sources (e.g., an advertisement campaign server) in addition to streaming of any requested content at a sufficient quality. Further, such alternative content may comprise content is deemed relevant with respect to potential white spot areas likely to be encountered in the wireless UE device's expected route and/or may be based on the user's and other demographic information. Rather than playing back the alternative content immediately, it may be stored in a local cache (different from the ABR client's buffer). In one embodiment, when the wireless UE device is in a known white spot area, appropriate content is moved from the local cache into the ABR buffer for playback, which may be triggered responsive to network-based messaging or UE device determination (block 374). Thereafter, the alternative content is played out from the ABR buffer based on modified manifest files that reference to the internal cache location (block 376).

It should be appreciated that the foregoing blocks, steps and/or acts of FIGS. 3A-3C may be arranged or re-arranged in several combinations, which may be executed at different locations or at co-located network elements or nodes within a wireless network environment such as the example network environment 100 illustrated in FIG. 1. Further, redirection or switching of content playback (i.e., between user-requested media segments and locally-stored alternative content) may be client-independent (e.g., for a network-controlled implementation) or client-specific (e.g., for a client-controlled implementation), depending on where some of the foregoing blocks, steps and/or acts may take place. Additional details with respect to one or more of such embodiments may be exemplified in view of the following Figures described below.

Figure 4:
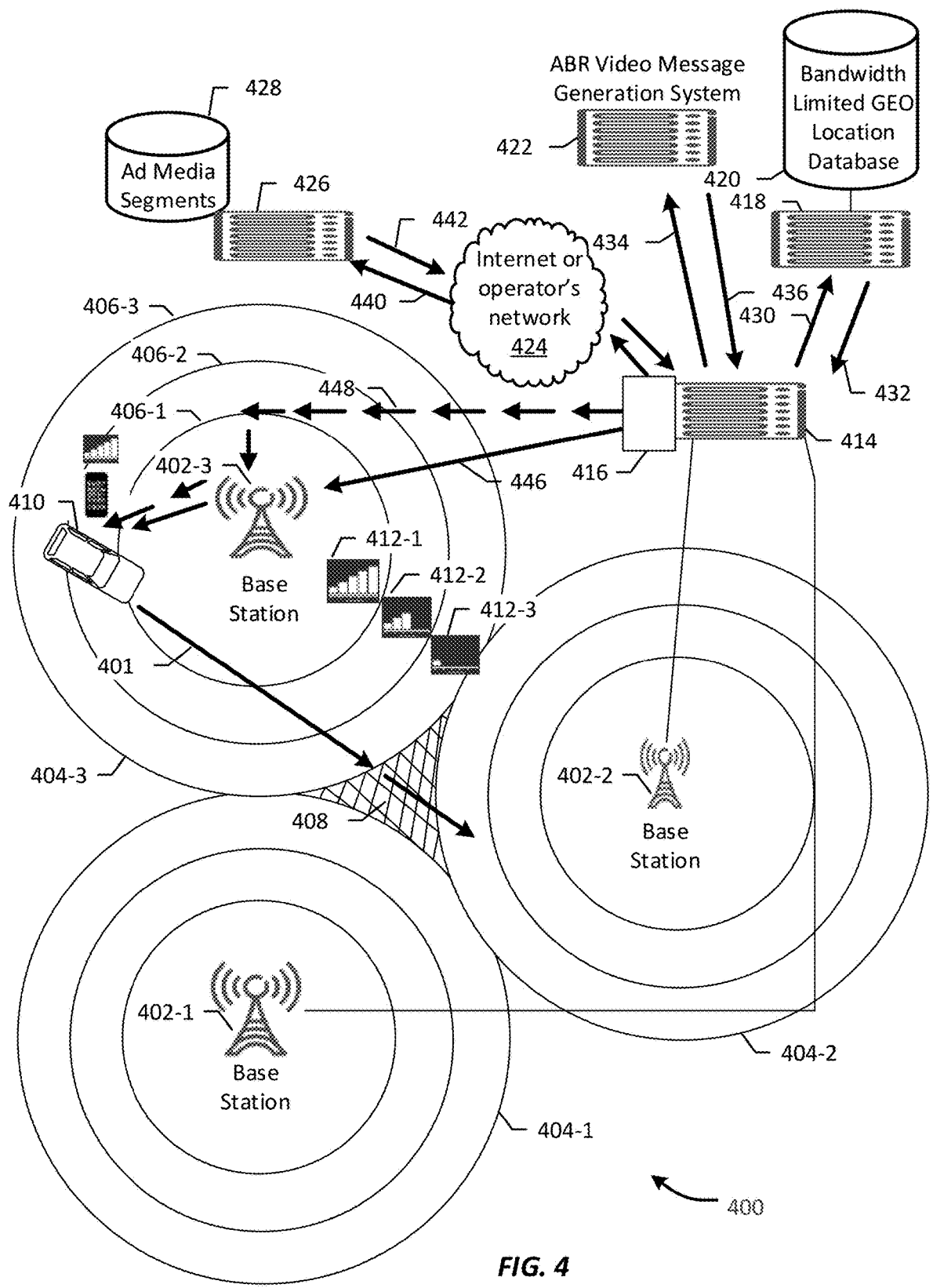
FIGS. 4-10 depict additional details with respect to an example wireless network environment optimized for ABR streaming and associated methods according to an embodiment of the present patent disclosure.
Figure 5:
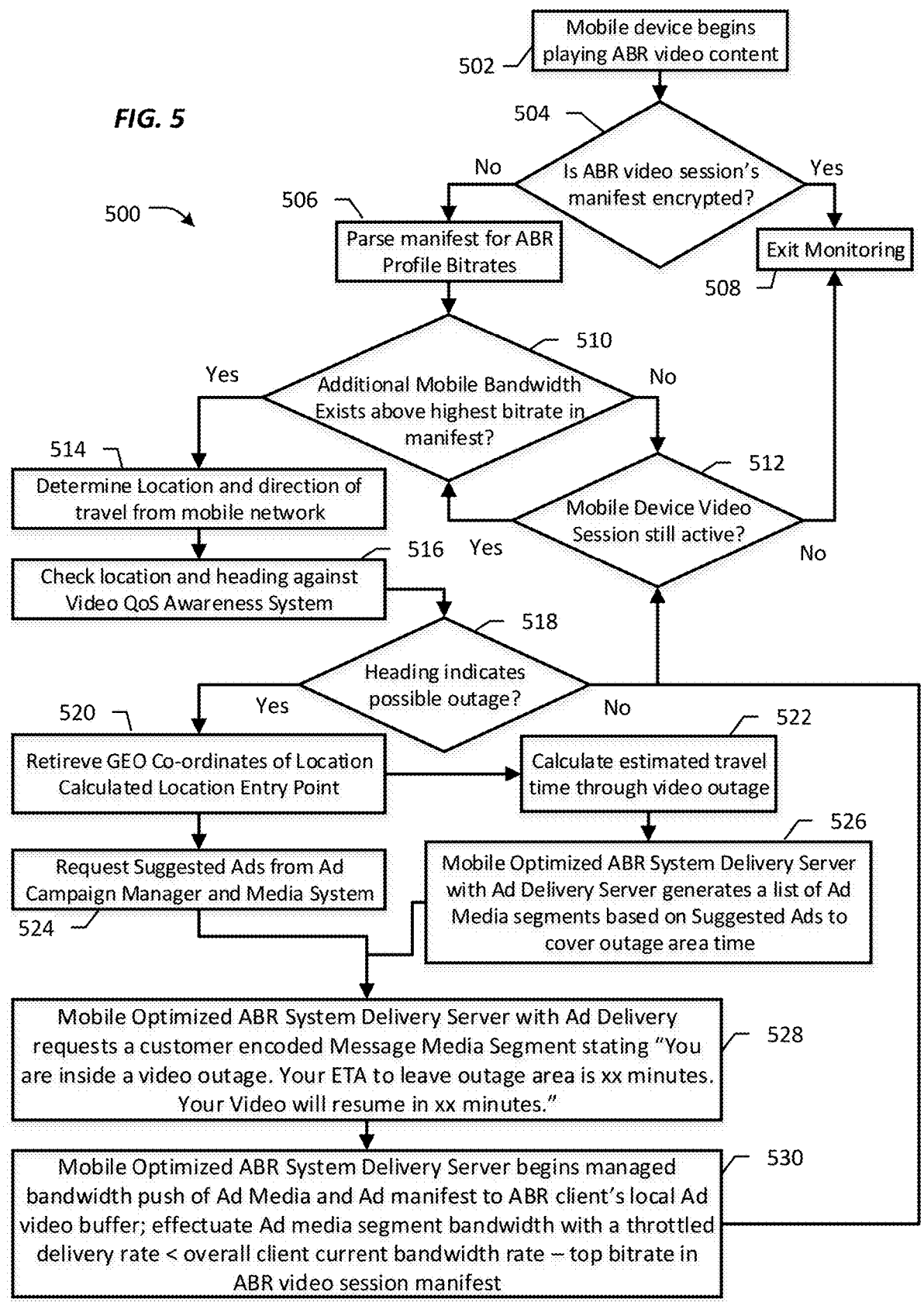
Figure 6:
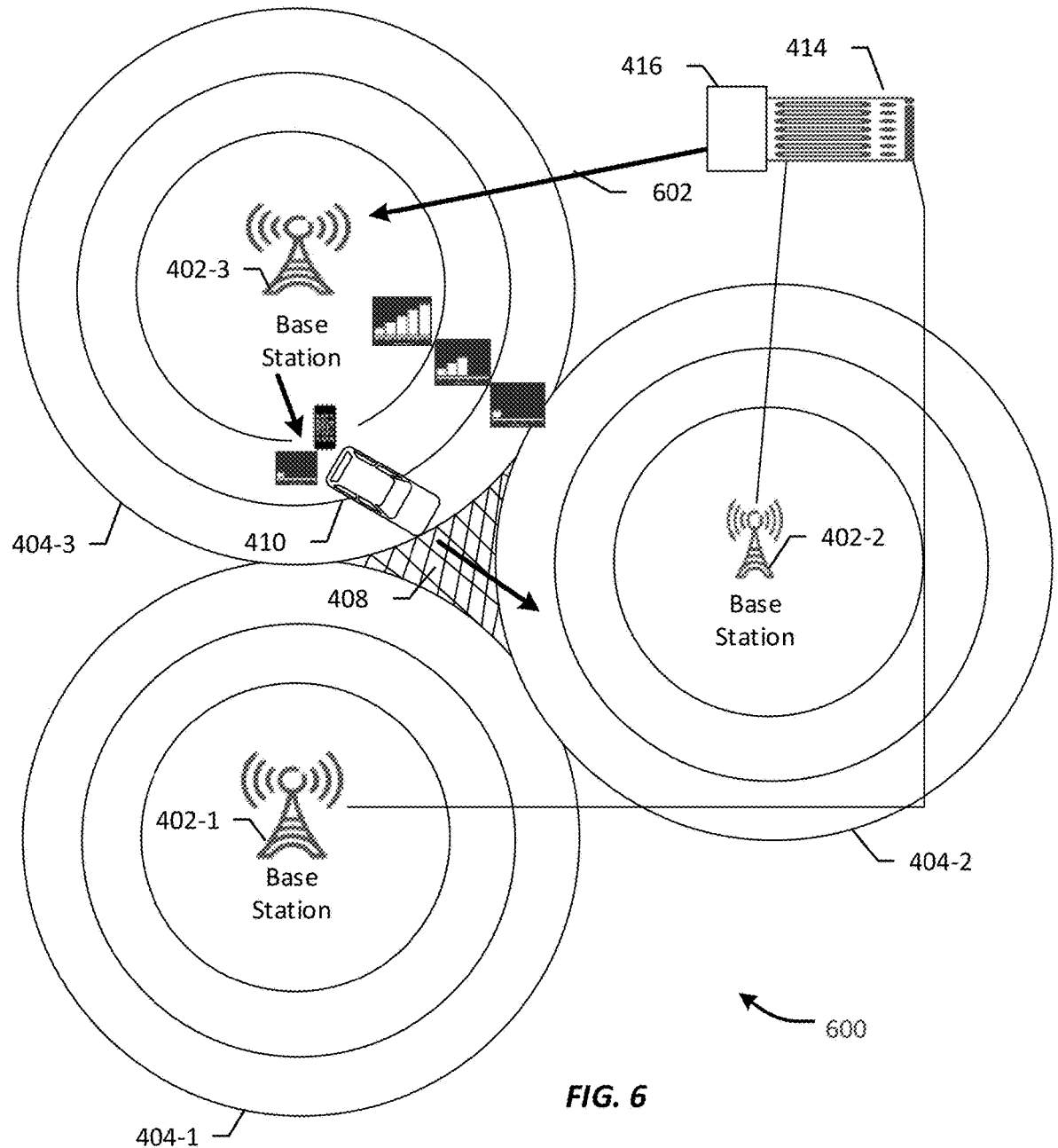
Figure 7:
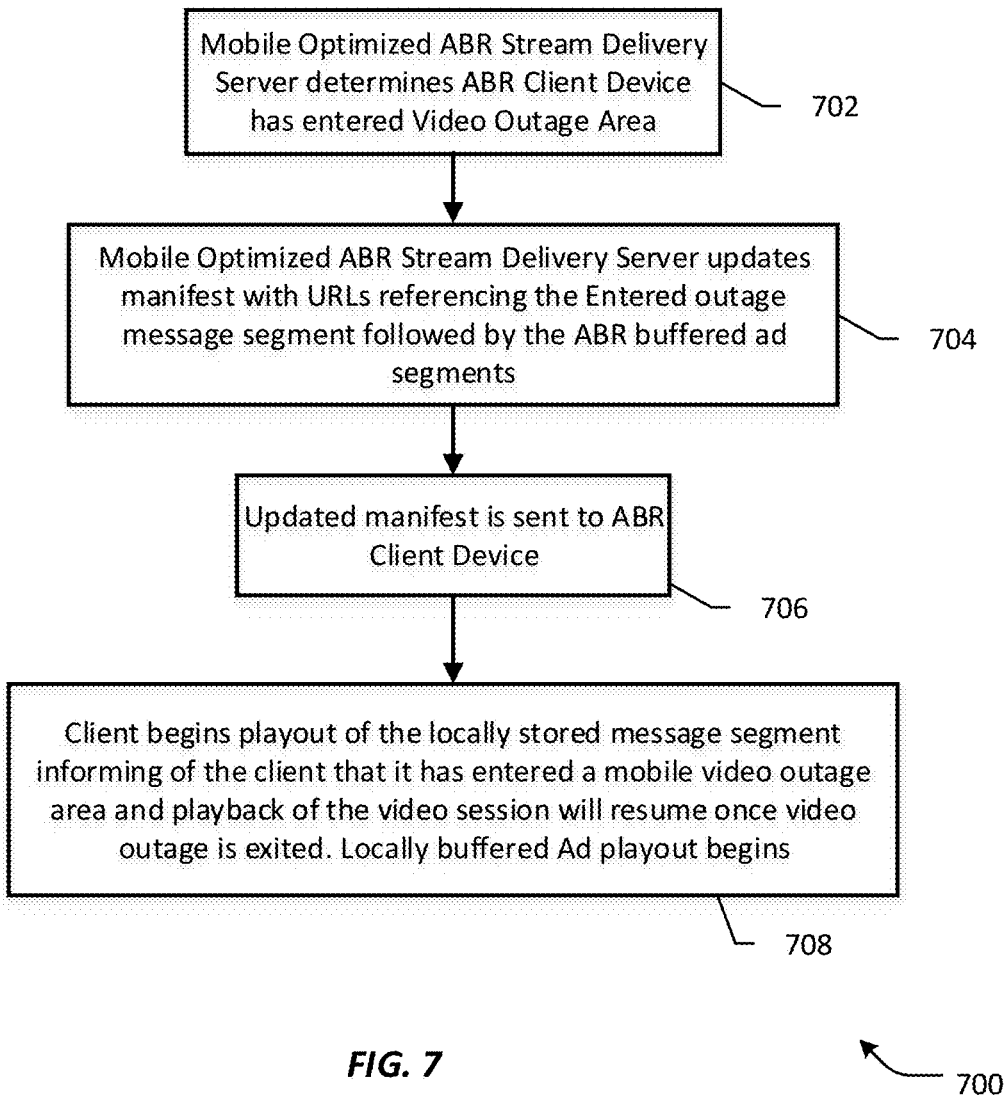
Figure 8:
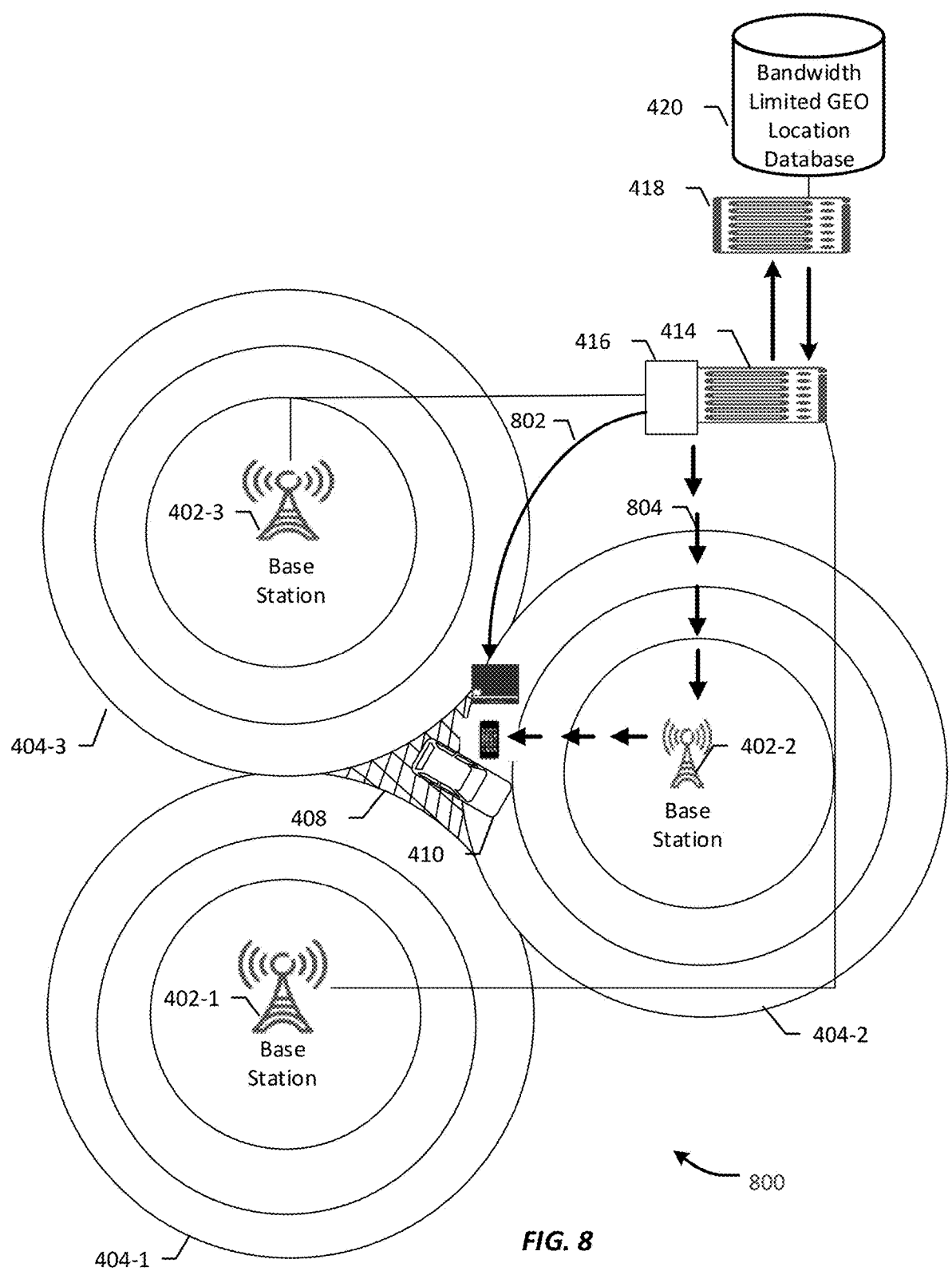
Figure 9:
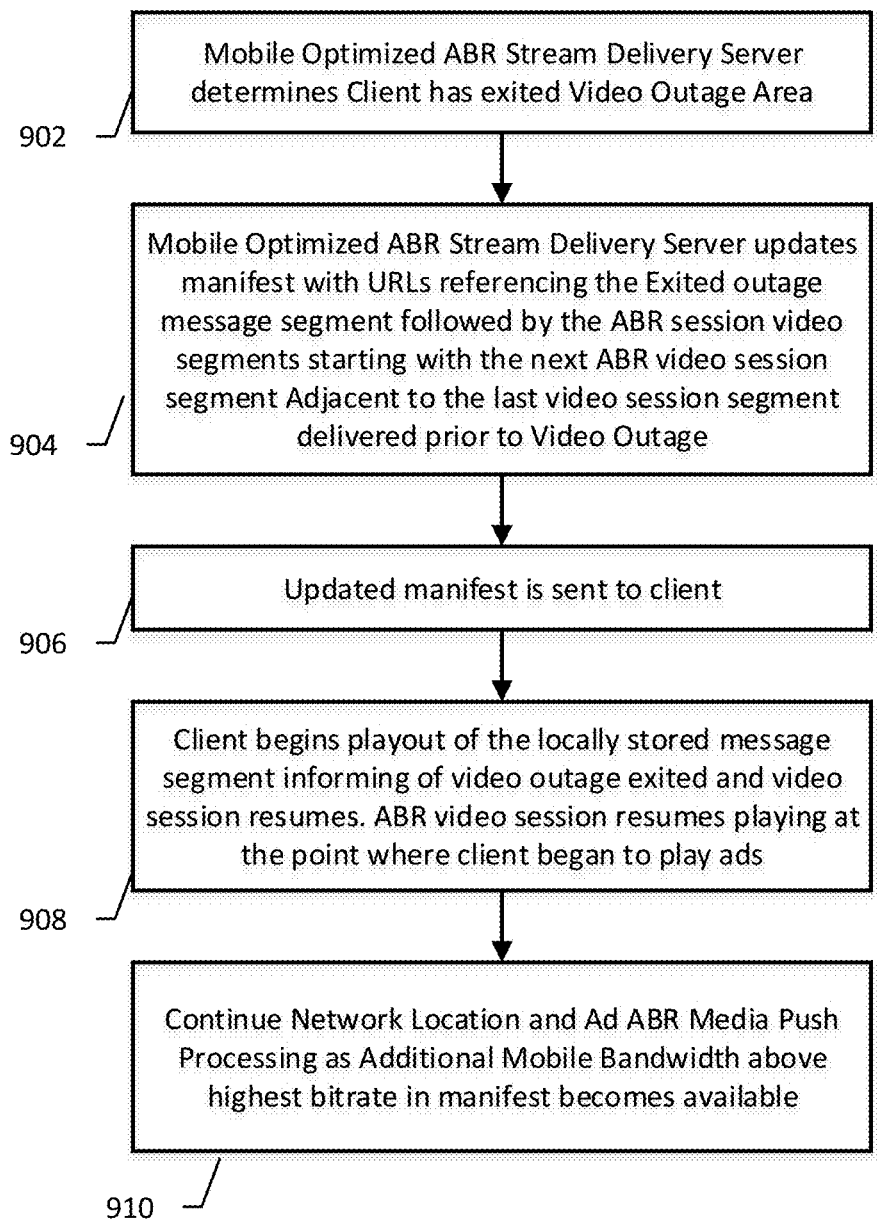
Figure 10:
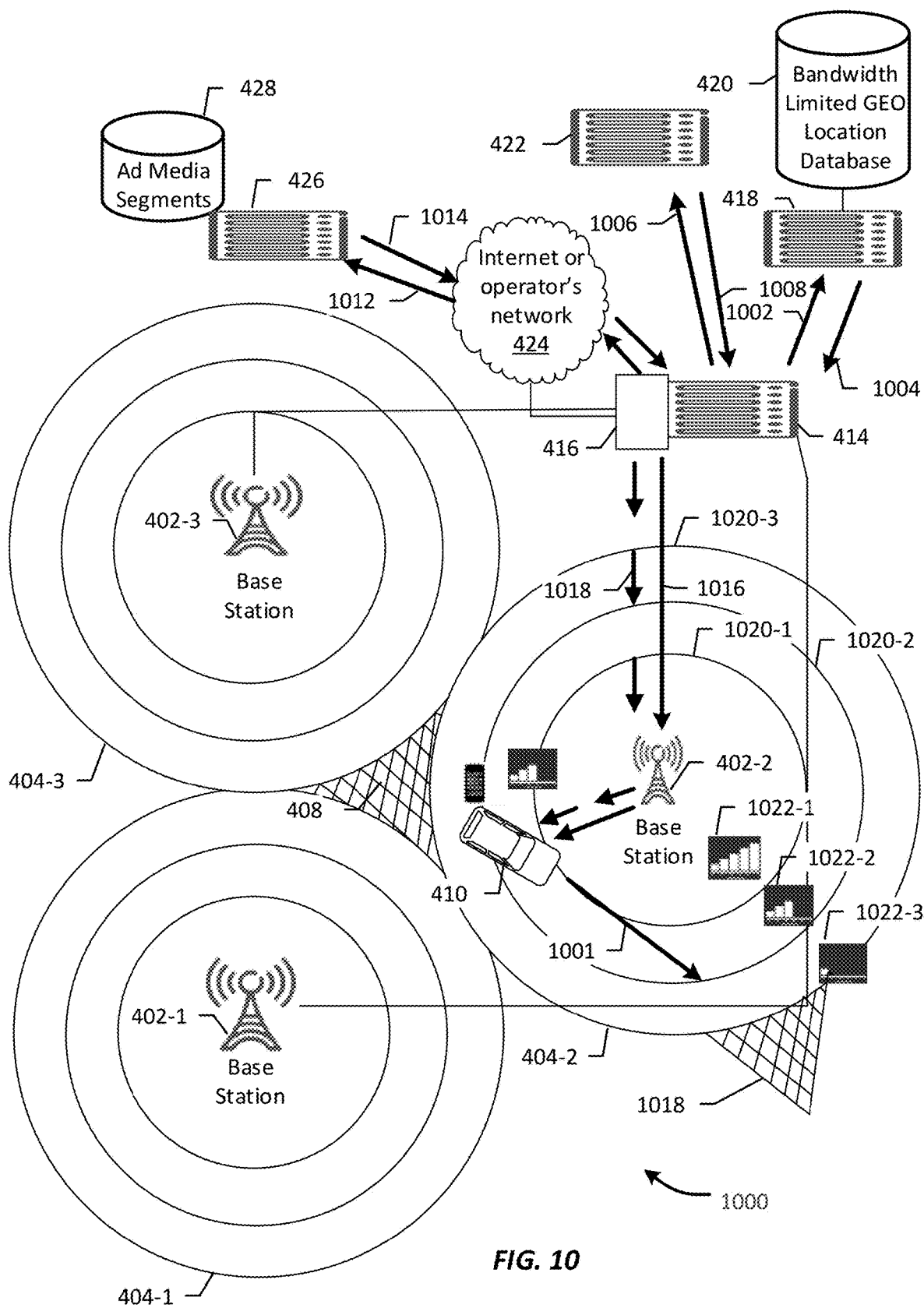

FIGS. 4-10 depict additional details with respect to an example wireless network environment optimized for ABR streaming and associated methods according to a network-controlled implementation of the present patent disclosure wherein a generic or legacy ABR client is operative for consuming content. Specifically, FIGS. 4 and 5 depict a wireless network environment 400 and associated processing 500 for effectuating network-controlled pre-caching or pre-populating advertisement content in a wireless UE device operating in a vehicle, collectively referred to by reference numeral 410. FIG. 6 depicts a portion 600 of the network environment 400 wherein an advertisement play out process 700 may be practiced according to the embodiment shown in FIG. 7. FIG. 8 depicts a portion 800 of the network environment 400 wherein an ABR streaming session resumption process 900 may be practiced according to the embodiment shown in FIG. 9. FIG. 10 depicts another network rendition 1000 corresponding to the network environment 400 wherein location-specific advertisements are pre-cached as the wireless UE device is anticipated to encounter another outage area of the network.

Taking reference to FIG. 4, the example wireless environment 400 is illustratively shown as comprising a plurality of coverage areas, e.g., areas 404-1 to 404-3, effectuated by appropriate wireless network infrastructure elements, e.g., base stations 402-1 to 402-3, corresponding thereto. As is known in the art, a radio coverage area by a base station may take any shape and include varying levels of signal quality and strength, wherein there may be some coverage gap depending on a number of factors. Illustratively, coverage areas 404-1 to 404-3 are exemplified as circular regions, each having a plurality of concentric signal quality/strength contours. By way of example, coverage area 404-3 is shown to include three such contours 406-1 to 406-3, each depicted with a respective signal level indicator icon, 412-1 to 412-3, respectively. Contour 406-1 having the highest signal quality is closest to base station 402-3, whereas contours 406-2 and 406-3 are spaced further away from the base station, with progressively deteriorating signal quality (i.e., strength, level, etc.). A radio white spot area or video outage area 408, which may take any shape, is illustratively shown as being disposed where the three coverage areas 404-1 to 404-3 come together. A UE-carrying vehicle 410 is illustratively shown as traversing from coverage area 404-3 to coverage 404-2, potentially via a path or route 401 that may traverse the video outage area 408.

To facilitate ABR streaming and alternative content pushing for local storage, a number of network nodes or elements may be configured to interface with or otherwise be included as part of the wireless network environment. A mobile-optimized ABR stream delivery server 414, which may be provided as part of a network controller node, is configured to deliver ABR content to wireless UE devices via respective sessions established through the serving base stations of the wireless network environment, wherein the content being delivered may originate from any number of content sources and/or may involve appropriate CDN infrastructure elements (not shown in FIG. 4). Accordingly, at least in one embodiment, the ABR stream delivery server 414 may be provided with appropriate radio interfaces with respect to the serving base stations and may be configured to maintain/monitor UE devices' real-time mobile sessions. The ABR stream delivery server 414 may also interface with a video quality location awareness server 418 and associated geo-location database 420 having relevant video outage information. In one implementation, such a database may be developed using a learning process described above with respect to FIG. 2, which may be augmented with additional features set forth in the commonly owned Video White Spot Learning patent application referenced previously. A Segment Encoding and User Session Segment Delivery and Alternative Content Push control module 416 (also referred to as a "delivery module" or "delivery control module" herein) may monitor delivery bitrate/bandwidth for the streaming content delivered by the ABR stream delivery server 414 as well as effectuate the delivery of alternative content (e.g., advertisements) as will be discussed in more detail below. In one embodiment, the delivery module 416 may be integrated as part of the ABR stream delivery server 414 which may be configured to provide manifest files for the alternative content to the UE devices in addition to media segments delivered to the UEs pursuant to respective ABR streaming sessions. The ABR stream delivery server 414 and/or associated delivery control module 416 may therefore be interfaced, in one embodiment, with a suitable advertisement campaign management and media system 426 having a advertisement media segment database 428, for access via a public packet-switched network such as the Internet or an operator network, cumulatively referred to by reference numeral 424.

Continuing to refer to FIG. 4, the ABR stream delivery server 414 and/or associated delivery control module 416 may also be interfaced, in a network-controlled implementation, to a video message generation system 422 for generating and providing appropriate notifications and/or messages to the wireless UEs as they enter or approach a video outage area. Broadly, in one embodiment, such notification messages may comprise a video-encoded still image of a message (text, graphics, etc.) configured to apprise the user of any information relevant with respect to the streaming session, e.g., to the effect that an outage has occurred and/or alternative content may be played in lieu of the requested content and/or for a certain predetermined time, for instance. The video-encoded still image, which may be encoded at a low bitrate, may be provided or otherwise delivered to the UE devices when the radio conditions permit (i.e., having sufficient bandwidth while continuing to effectuate the requested ABR streaming sessions), using suitable manifest files and/or redirection techniques as set forth in additional detail in one or more of the following commonly owned co-pending U.S. patent application(s): (i) "CONFLICT DETECTION AND RESOLUTION IN AN ABR NETWORK" (Ericsson Ref. No.: P42221-US1), application Ser. No. 14/194,868, filed Mar. 3, 2014, in the name(s) of Christopher Phillips et al., and (ii) "CONFLICT DETECTION AND RESOLUTION IN AN ABR NETWORK USING CLIENT INTERACTIVITY" (Ericsson Ref. No.: P42767-US1), application Ser. No. 14/194,918, filed Mar. 3, 2014, in the name(s) of Christopher Phillips et al., now issued as U.S. Pat. No. 9,455,932, cross-referenced hereinabove and hereby incorporated by reference herein.

Turning to FIG. 5, an advertisement content push process 500 in a network-controlled implementation may now be described in conjunction with the network arrangement of FIG. 4. In a normal streaming operation (e.g., under suitable radio conditions supportive of sufficient bandwidth), the UE device 410 is engaged in pulling high bitrate media contents (e.g., 2 Mbs segments) via its serving base station 402-3 shown in FIG. 4 as streaming session path 448 (block 502). A suitable network entity, e.g., the ABR stream delivery server 414 and/or associated delivery control module 416 may initially determine if the ABR streaming session's manifest is encrypted (block 504). If so, no further monitoring takes place and the processing for pre-population of advertisement content is subsequently refrained (block 508). If the manifest file is not encrypted, the network entity may parse the manifest file for ABR profiles (block 506), i.e., the media segment bitrates specified in the manifest file for the current ABR streaming session. A determination may be made whether the overall bandwidth of the wireless UE device 410 exceeds a highest bitrate indicated in the manifest file, i.e., if there exists additional mobile bandwidth over and above the bandwidth necessary to support pulling the media segments with the highest bitrate specified in the manifest file (block 510). If not, a further determination may be made to verify whether the wireless UE device 410 is still active (block 512). If it is determined that the wireless UE device is not active, further monitoring and processing for pre-population of advertisement content may be refrained (block 508). On the other hand, if it is determined that the wireless UE device is active, the process flow may revert to checking again whether there exists additional bandwidth (block 510). In one variation, such a process loop may involve waiting for a certain period of time before re-determining additional bandwidth availability.

If there is additional bandwidth as determined at block 510, a further determination may be made to determine at least one of a location and direction of travel associated with the UE-carrying vehicle 410 (block 514). As explained previously, such a determination may be effectuated using any known or heretofore unknown location techniques available with respect to the wireless network environment 400 depending on its radio technology implementation. Thereafter, one or more determinations may be made as to whether the UE-carrying vehicle 410 is headed in a direction likely to encounter a video outage area (i.e., a radio white spot), and if so, what its coordinates are and how long it will take to traverse through it, which determinations/decisions and associated calculations may be effectuated by way of one or more request/response mechanisms with respect to the video quality location awareness server 418 and associated geo-location database 420 having relevant video outage information, as set forth at blocks 516, 518, 520 and 522. Illustratively, a request/query 430 to the video quality location awareness server 418 may comprise:

Request anticipated Video Outage;
Location: Client Location: 19.9423 Deg North; 155.9985 Deg West;
Heading: 110 Deg East;
Speed: 60 mph Responsive thereto, the video quality location awareness server 418 may provide a response 432 that comprises the following with respect to the travel path 401:

Response;
Outage Begin 19.0323 Deg North; 155.0012 Deg West;
Interval: 5 min 30 Sec If the current heading indicates no upcoming outage, further monitoring and processing for pre-population of advertisement content may be refrained as before (block 508). Otherwise, upon obtaining location coordinates of the video outage area and estimated travel time through video outage (block 520, 522), one or more request/response mechanisms may be carried out with respect to the alternative content server/system 426 and associated media segment database 428 via network 424 for obtaining suggested advertisements that cover the outage area time (blocks 524, 526). In FIG. 4, such interactions are illustratively shown as a request/response mechanism, wherein an example request/query 440 may include the following input:

Calculated Outage Location;
Location: Client Location: 19.0323 Deg North; 155.0012 Deg West;
User Demographic Information: Age, Gender, Etc.

Responsive thereto, an example response 442 may include the following information:

6 advertisement clips/segments;
(Location-specific and/or User-specific);
Total time=Calculated Video Outage Interval of 5 min 30 Sec Further, the ABR stream delivery server 414 and/or associated delivery control module 416 may effectuate additional request/response mechanisms, e.g., request 434 and response 436, with respect to the video message generation system 422 for generating/obtaining one or more custom message segments, e.g., a customer message stating: "You are inside a video outage. Your ETA to leave outage area is xx minutes. Your Video will resume in xx minutes" (block 528). Thereafter, the network entity 414/416 may commence managed bandwidth push of advertisement media segment(s) and associated manifest(s) as well as the custom message notification(s) and associated manifest(s) to the wireless UE device 410 with a throttled delivery rate based on an amount by which the device's overall bandwidth exceeds the highest bitrate indicated in the manifest file of the current ABR streaming session (block 530), which is illustratively shown in FIG. 4 as ad media and message push path 446 to the serving base station 402-3.

Referring now to FIG. 6, depicted therein is a portion 600 of the network environment 400 described above in detail. It should be recognized that at least certain portions of the description of FIG. 4 are equally applicable with respect to the wireless network environment portion 600, mutatis mutandis, wherein an advertisement play out process 700 may be practiced according to an embodiment shown in FIG. 7. As the UE-carrying vehicle 410 continues to travel towards coverage area 404-2 served by the base station 402-2, it begins to experience progressively lower quality radio coverage locations of the coverage area 404-3 before entering the video outage area 408. Pursuant to such signal deterioration and/or other methods of localization described herein, the ABR stream delivery server 414 and/or associated delivery control module 416 may determine that the UE-carrying vehicle or client 410 has entered the loss of video coverage area (block 702). Responsive thereto, service logic provided at the ABR stream delivery server 414 and/or associated delivery control module 416 is operative in one embodiment to update or otherwise modify location pointers of the ABR streaming session to be replaced by the pointers associated with the pre-populated alternative content and/or custom message notifications that reference the wireless UE device's internal or local cache where such content was downloaded and stored. That is, the manifest URLs that would have pointed to locations elsewhere in the network are now replaced with URLs that point to a local storage file path, the implementation of which may depend on the device's software (i.e., operating system or other control software), which are then transmitted to the wireless UE device 410 (block 706). It should be appreciated that although the radio signal quality may be less than desirable or sufficient for purposes of ABR streaming of video content, the wireless UE device 410 may continue to be in radio communication with one or more base stations, e.g., 402-1 to 402-3, as it approaches/enters any white spots along the way, which may be adequate for sending the updated manifest files via any suitable means. In FIG. 6, a path 602 is illustrative of transmission of updated manifests to base station 402-3 that contain pointers to the content (cached at the wireless UE device 410) whose playback is estimated or otherwise calculated to take up the time required to traverse the video outage area 408. In one implementation, the updated manifest file(s) may contain URLs that take on a form such as, e.g., file://<filename and path to segment>, depending on the device software. In some implementations, the device software may not allow accessing such internal references by the ABR client application executing thereon. In such a scenario, a local HTTP server functionality may be provided as part of the wireless UE device's software architecture, whereby updated manifests may accordingly include URLs pointing to the local HTTP server in a manner that is more acceptable. For example, an illustrative URL referencing local HTTP server may take on the form: http://127.0.0.1/message/. Additional subject matter relative to manipulation, updating or modification of URLs and/or manifest files may be found in one or more of the following commonly owned co-pending U.S. patent application(s): (i) "TIME-SENSITIVE CONTENT MANIPULATION IN ADAPTIVE STREAMING BUFFER" (Ericsson Ref. No.: P39531-US1), application Ser. No. 14/179,876, filed Feb. 13, 2014, in the name(s) of Jennifer Reynolds et al., now issued as U.S. Pat. No. 9,210,207, cross-referenced hereinabove and hereby incorporated by reference herein.

Responsive to receiving the updated manifest files, the ABR client application executing on the wireless UE device is operative to play out the locally stored message segment (e.g., video-encoded still image of a text to the effect that it has entered a video outage area and playback of the video session will resume once the video outage area is exited). After the notification message playback, the ABR client application may commence playback of the locally stored advertisement content based on the sequence of associated manifest URLs as set forth at block 708.

Turning to FIG. 8, depicted therein is a portion 800 of the network environment 400 wherein an ABR streaming session resumption process 900 may be practiced according to the embodiment shown in FIG. 9. As the UE-carrying vehicle 410 exits the video outage area 408 and begins to enter the coverage area 404-2, it may experience improved radio signal quality. The ABR stream delivery server 414 and/or associated delivery control module 416 may determine that the UE-carrying vehicle or client 410 has exited the video coverage area (block 902). Service logic executing thereat may further be configured to update or modify the manifest files to include URLs that point to one or more locally-cached notification messages appropriate to the exiting state, followed by pointers to ABR media segments starting at the segment adjacent to the last media segment what was delivered prior to video outage (block 904). Thereafter, the updated manifest files may be transmitted (block 906) to the UE device 410, as shown by path 802 in FIG. 8. Responsive to the updated manifest files, the ABR client application on the wireless UE device commences play back of the locally stored message segment(s) apprising the user of video outage exit condition and subsequent commencement of the ABR streaming session at a suitable point (block 908). As the example ABR streaming session set up in FIG. 4 involves a segment pull rate of 250 Kbs, lowest ABR encoded bitrate of 500 Kbs and highest ABR manifest bitrate of 2 Mbs, the resumed streaming session initially throttles at pulling 500 Kbs media segments, delivered via a path 804 to base station 402-2 as shown in FIG. 8. Also, network entity 414/416 may interface with video quality location awareness server 418 and associated geo-location database 420 via suitable request/response messages (e.g., similar to request 430 and response 432 described hereinabove with respect to FIG. 4), to obtain future video outage locations and effectuate pre-populating/pre-caching of relevant alternative content with respect to such locations, as the additional bandwidth progressively becomes more available (block 910).

FIG. 10 depicts another network rendition 1000 corresponding to the network environment 400 wherein location-specific advertisements continue to be pre-cached as the wireless UE device 410 is anticipated to encounter another outage area 1018 of the network in its expected route 1001 traversing the service area 404-2. Analogous to the coverage area 404-3 described hereinabove, coverage area 404-2 of base station 404-2 is shown to include a plurality of concentric signal quality/strength contours 1020-1 to 1020-3, each depicted with a respective signal level indicator icon, 1022-1 to 1022-3, respectively. Contour 1020-1 having the highest signal quality is closest to base station 402-2, whereas contours 1020-2 and 1020-3 are spaced further away from the base station, with progressively deteriorating signal quality (i.e., strength, level, etc.). For example, area enclosed by contour 1020-1 may have sufficient signal strength to support an overall bandwidth of 8 Mbs, whereas areas enclosed between contours 1020-1 and 1020-2 and between contours 1020-2 and 1020-2 may support overall UE bandwidths of 2 Mbs and 500 Kbs, respectively. When the wireless UE device 410 is within the area enclosed by contour 1020-1, service logic associated with the ABR stream delivery server 414 and/or associated delivery control module 416 is operative to determine that given the highest bitrate of ABR streaming session as being 2 Mbs, there exists additional bandwidth for pushing updated advertisements and notification messages relevant with respect to the next likely outage area 1018 based on the current heading, direction, and/or speed information associated with the estimated route 1001. Similar to the request/response messages 430/432, the ABR stream delivery server 414 and/or associated delivery control module 416 is operative to query the video quality location awareness server 418 and associated geo-location database 420 again via a request message 1002 containing updated location/heading information. Responsive thereto, a response 1004 containing updated video outage area information, including, e.g., its coordinates and an estimate of how long it will take to traverse the outage area, etc., is provided. Using request/response queries 1006/1008 similar to request/response queries 434/436, and request/response queries 1012/1014 similar to request/response queries 440/442, the ABR stream delivery server 414 and/or associated delivery control module 416 is operative to obtain appropriate advertisement segments and notification messages for pushing to the wireless UE device 410, in a manner similar to the process set forth in FIG. 5 described above, mutatis and mutandis, relevant with respect to the new video outage area 1018. As it has been determined that there is sufficient bandwidth for effectuating streaming of highest bitrate media segments, the functionality of network entity 414/416 is operative to throttle the delivery of ABR segments at 2 Mbs via base station 402-2 as exemplified by path 1018. Further, the network entity 414/416 commences managed bandwidth push of advertisement media segment(s) and associated manifest(s) as well as the custom message notification(s) and associated manifest(s) to the wireless UE device 410, via base station 402-2 as exemplified by path 1016, with a throttled delivery rate based on the additional bandwidth amount available, similar to the functionalities set forth at block 530 of FIG. 5.

It will be realized that in the foregoing embodiments redirection of ABR play-back in anticipated outage areas (i.e., from ABR media segments to alternative content and back to ABR media segments) is mainly controlled by the network-based functionalities (e.g., the ABR stream delivery server 414 and/or associated delivery control module 416 in conjunction with other wireless network nodes) wherein the network-based service logic is operative to determine when an ABR client device is in the outage area and dynamically adjust the manifest URLs to the stored buffer locations within the UE device for commencing the alternative content cached thereat. As seen from the detailed description hereinabove, some of the embodiments may also provide for appropriate message notifications to the user to facilitate a richer and more helpful experience with respect to transitioning in and out of radio white spot areas.

Figure 13A:
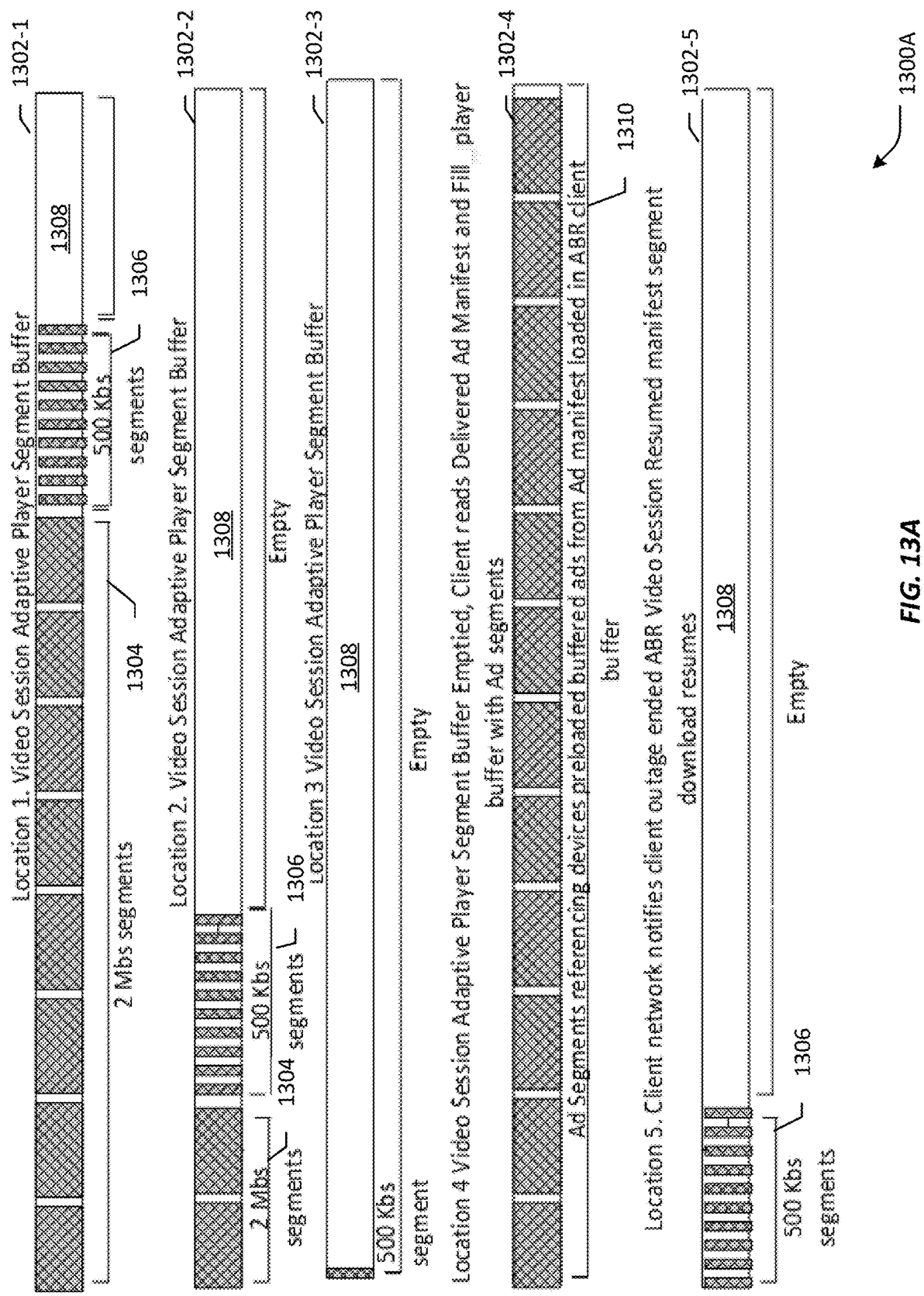
Figure 13B:
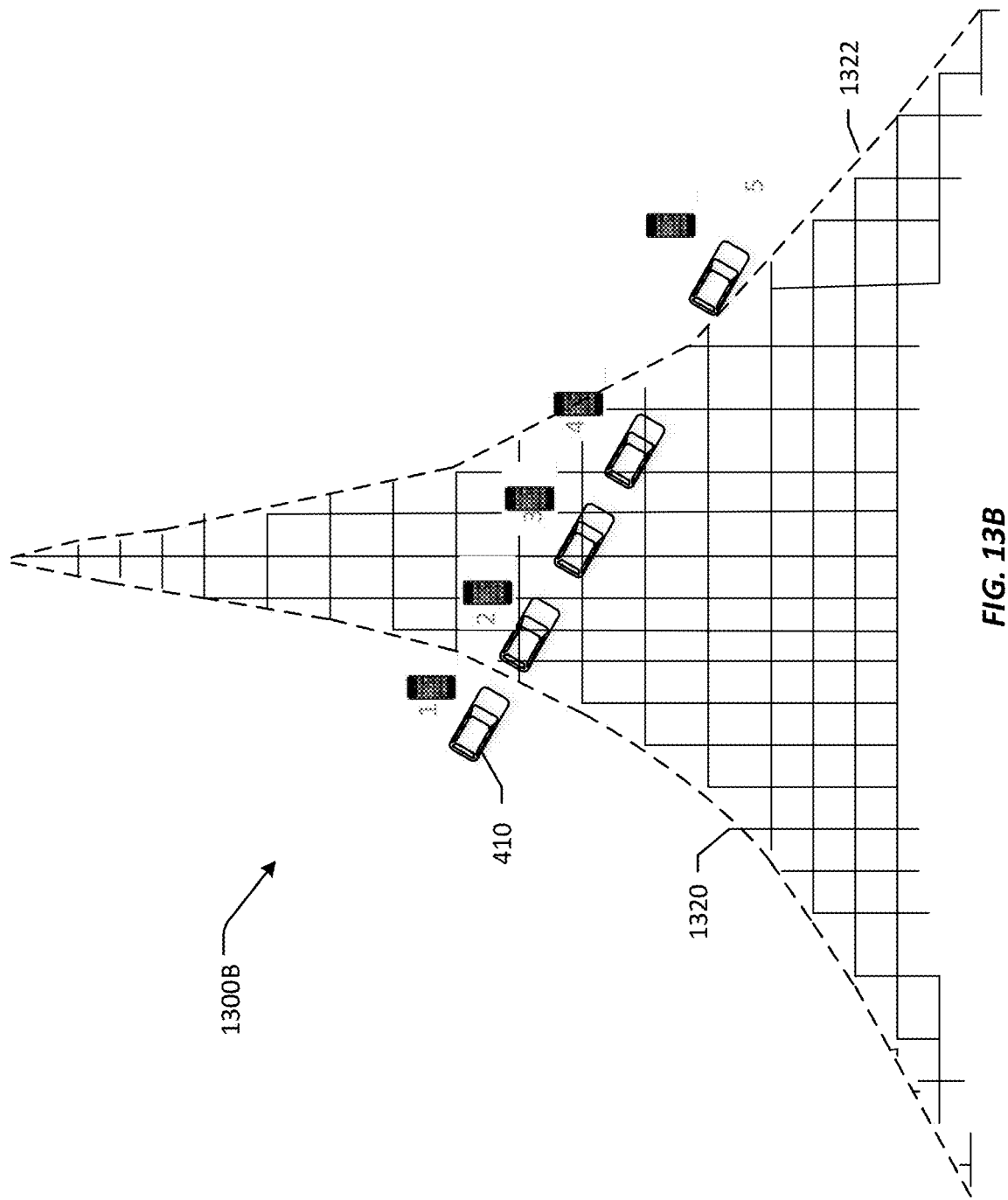
Figure 14:
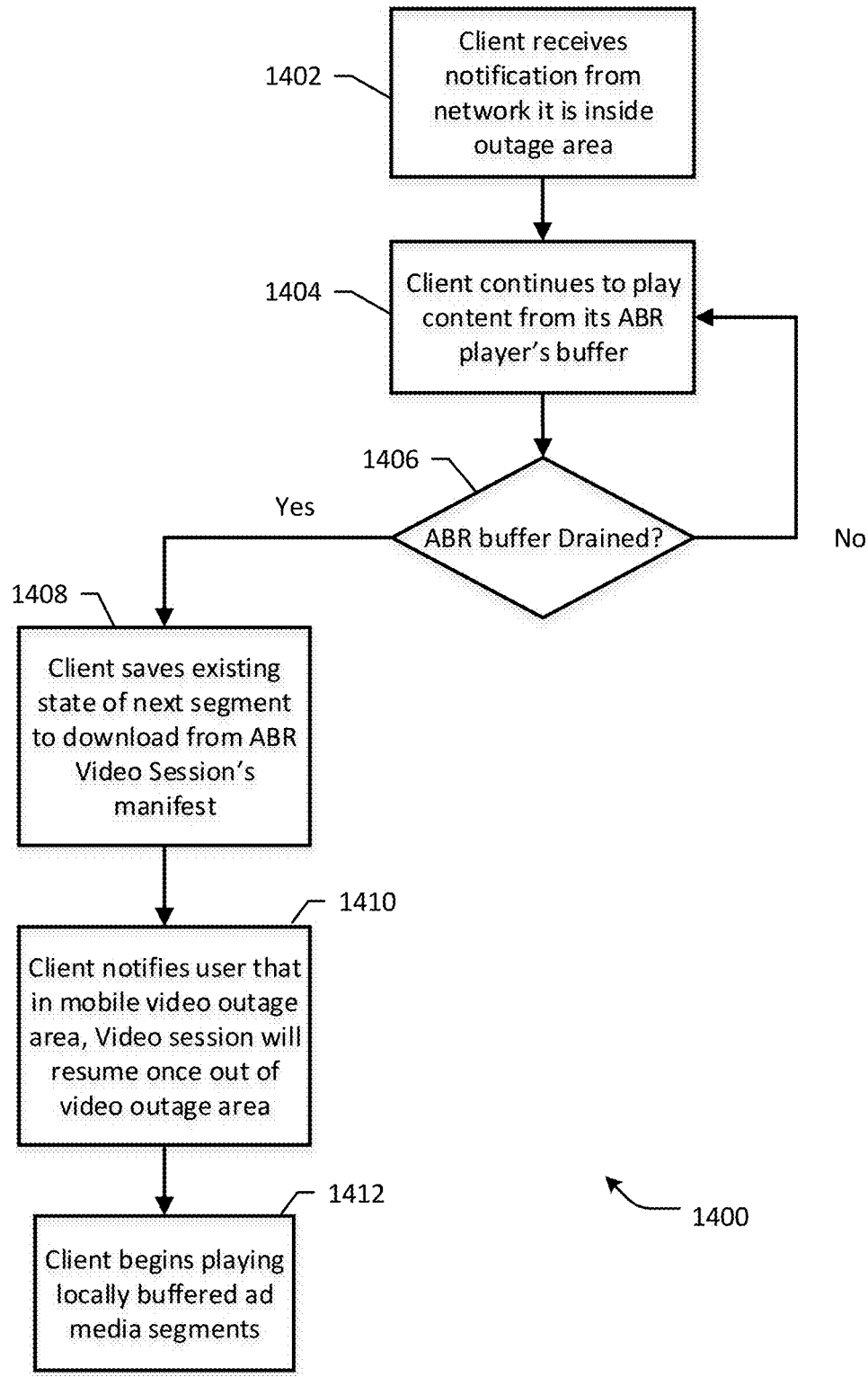
Figure 15:
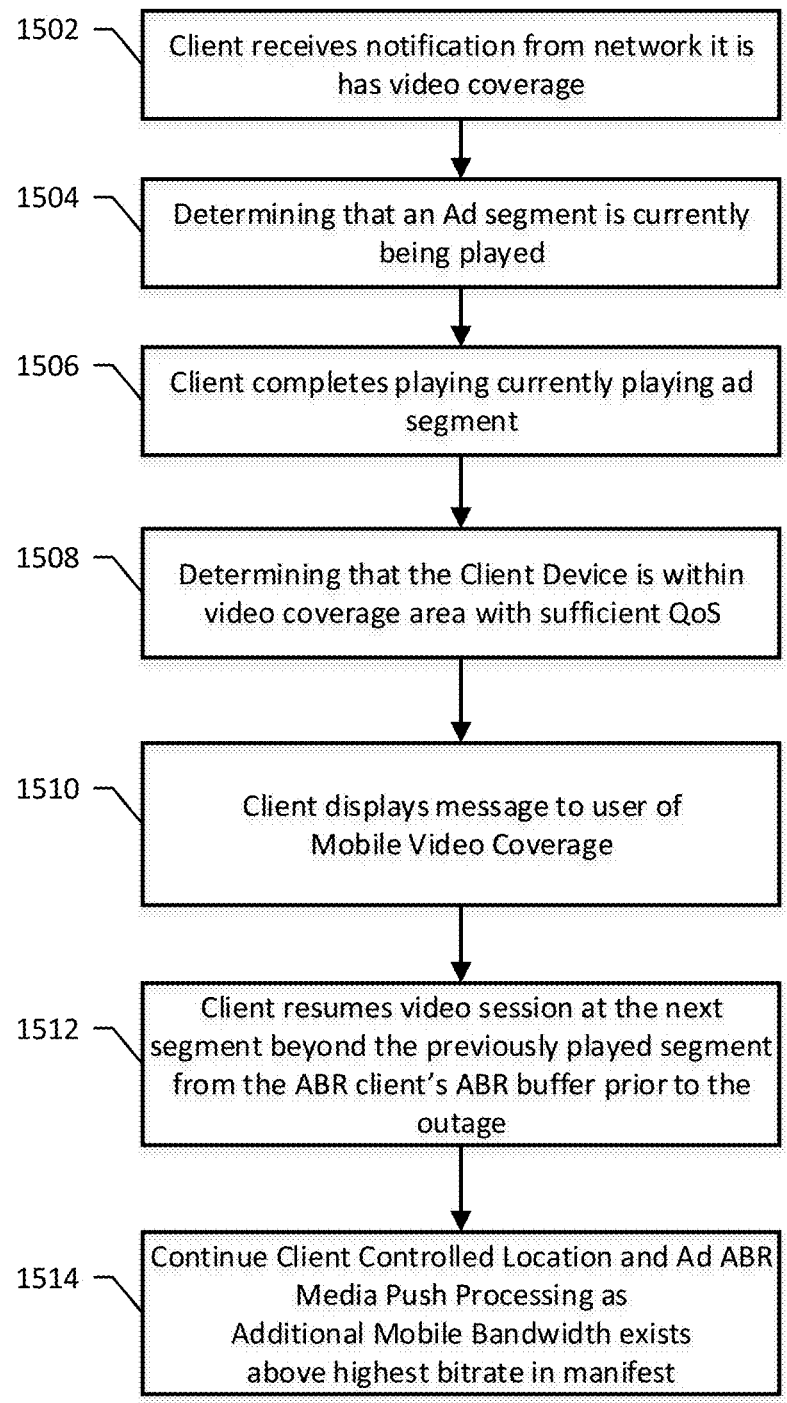
Figure 16:
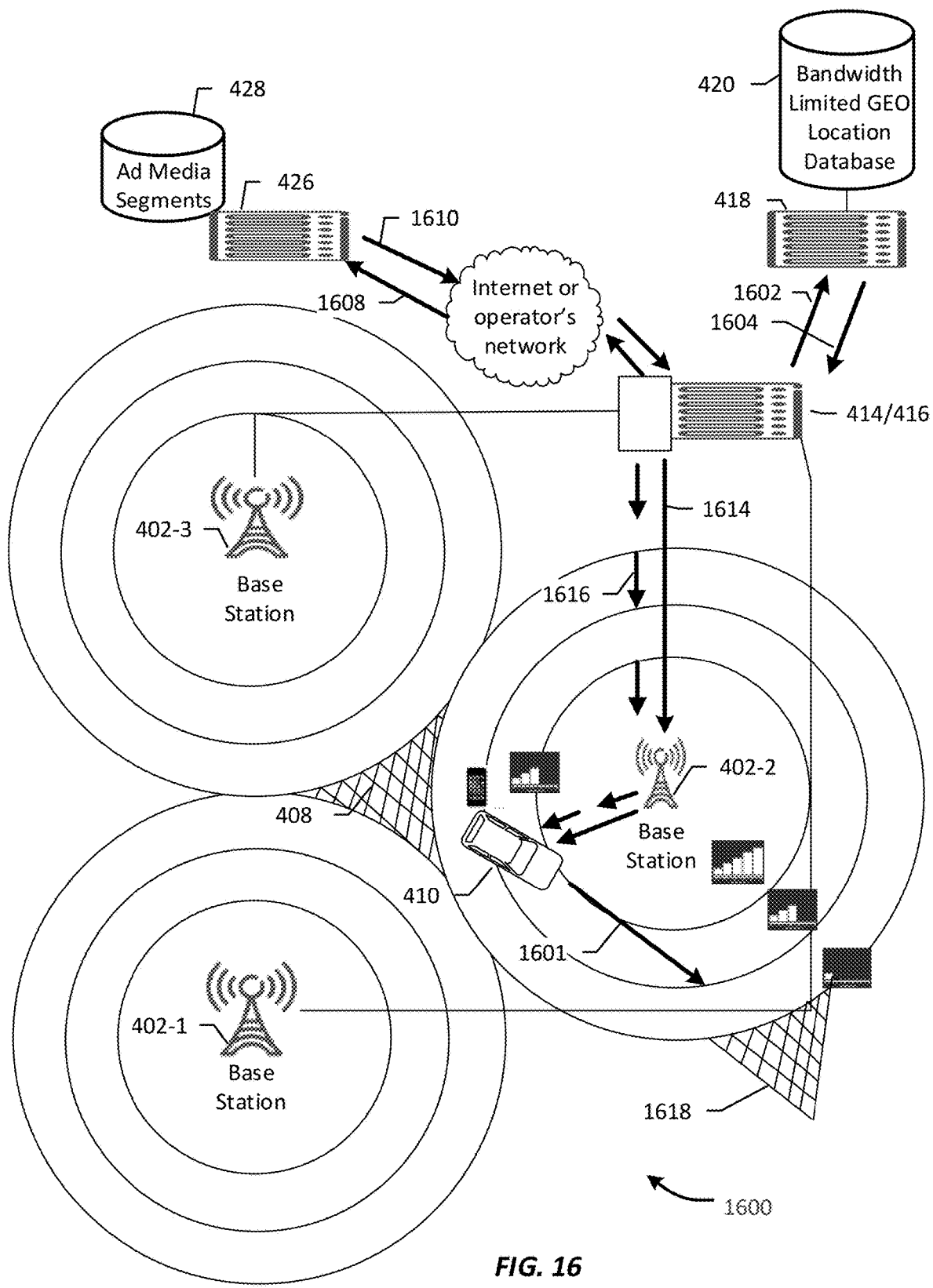

In certain other embodiments of the present patent disclosure, a client-specific or client-controlled redirection may be implemented especially where custom ABR clients are deployed. In such implementations, when the ABR client receives or otherwise obtains a notification that it is in an area of non-sustainable video bandwidth, it automatically begins playing buffered alternative content until it is determined that the client has traversed through the video outage area. FIGS. 11-16 depict additional details with respect to client-controlled redirection an example wireless network environment optimized for ABR streaming. Similar to FIGS. 4-10, FIGS. 11-16 depict various aspects of an illustrative client-controlled redirection process for purposes of the instant patent application. Specifically, FIGS. 11 and 12 relate to a wireless network environment 1100 and associated processing for effectuating a client-controlled advertisement push process. FIG. 13A depicts example ABR buffer status/condition in a client-controlled play out scenario relative to various locations as the client encounters and traverses through a video outage area as illustrated in FIG. 13B. FIGS. 14 and 15 depict example advertisement play out process 1400 and ABR streaming session resumption process 1500, respectively. Finally, FIG. 16 depicts another network rendition 1600 corresponding to the wireless network environment 1100 wherein advertisements continue to be pushed in a client-controlled manner as the wireless UE device is anticipated to encounter another outage area of the network.

Figure 11:
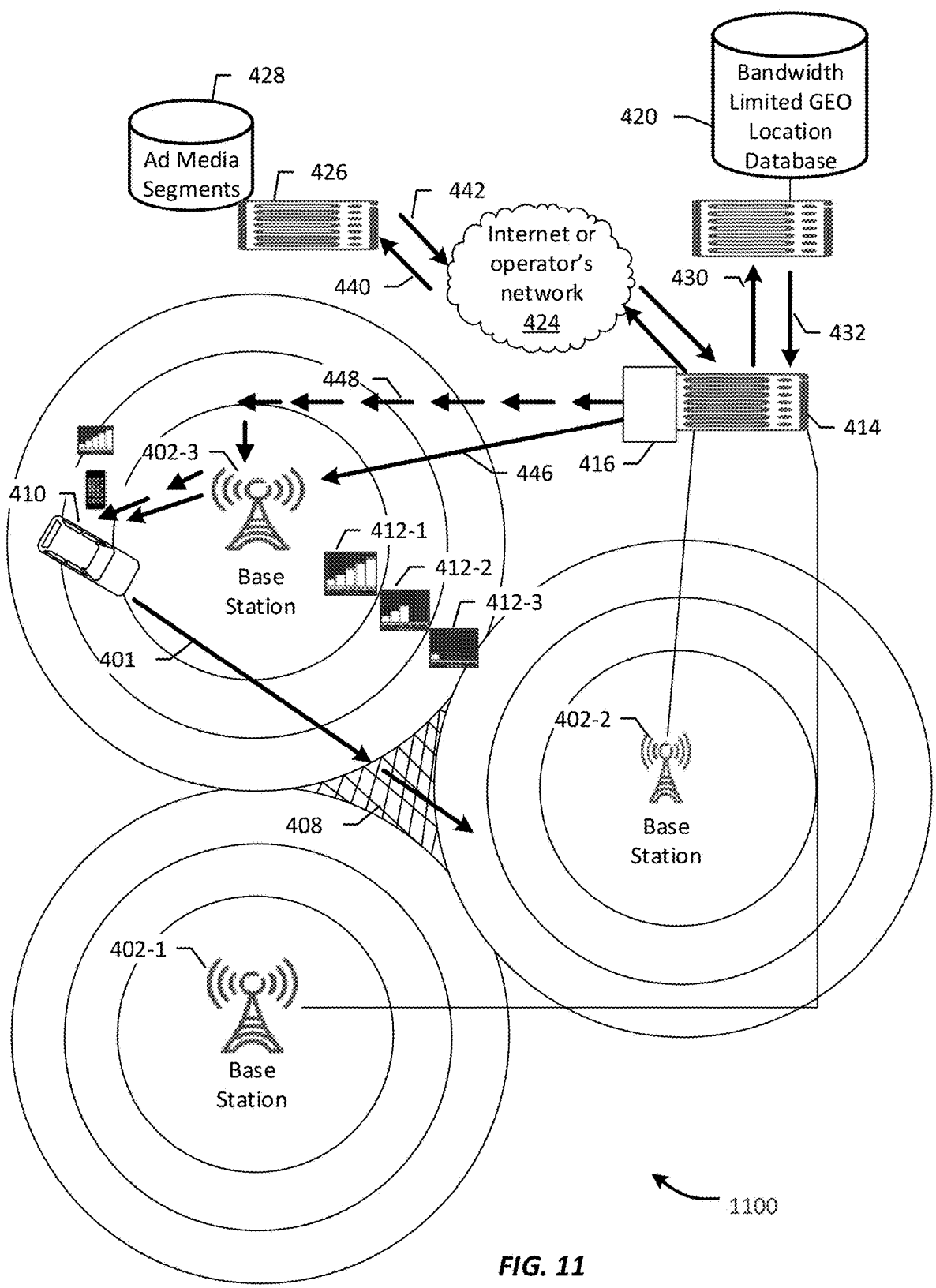
FIG. 11-16 depict additional details with respect to an example wireless network environment optimized for ABR streaming and associated methods according to another embodiment of the present patent disclosure.
Figure 12:
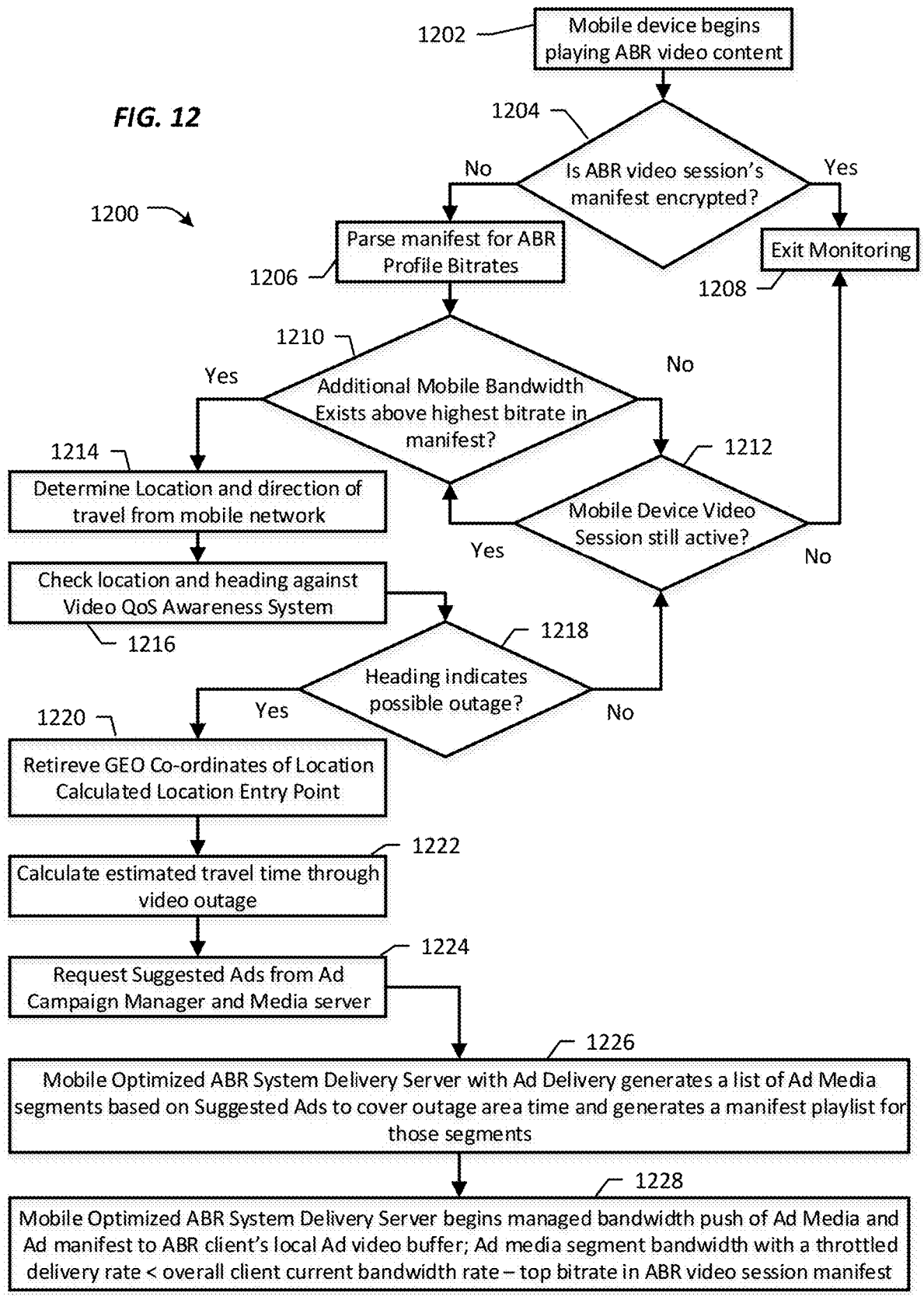

Turning to FIGS. 11 and 12, those skilled in the art will recognize that the example wireless network environment 1100 and associated advertisement push process 1200 are similar to the features depicted in FIGS. 4 and 5. Accordingly, for purposes of brevity, the description of FIGS. 4 and 5 is also applied and incorporated here with respect to FIGS. 11 and 12, mutatis mutandis. Focusing on the client-controlled aspects, it should be noted that the example network environment 1100 shown in FIG. 11 does not include a video-encoded message generation system in contrast to the network-controlled scenario set forth in FIG. 4. On the other hand, other network functionalities, e.g., interfacing of the ABR stream delivery server 414 and/or associated delivery control module 416 in conjunction with other wireless network nodes, geo-location database(s), advertisement media server(s), etc., remain substantially the same. Accordingly, the advertisement push processes 500 and 1200 are generally similar (e.g., blocks 502 to 524 in FIG. 5 and blocks 1202 to 1224 in FIG. 12), although some of the features of process 1200 may take place at or be triggered by a custom ABR client. Furthermore, process 1200 does not involve generating video-encoded notification messages and pushing such messages to the custom ABR client. On the other hand, a manifest playlist for the suggested advertisements that cover the estimated video outage area is generated for facilitating automatic play-back by the ABR client (block 1226). Thereafter, the advertisement manifest playlist as well as the advertisement segments are pushed to the ABR client in a managed bandwidth control process as set forth at block 1228.

Taking FIGS. 13A and 13B together, reference numeral 1300A refers to exemplary ABR buffer status at the wireless UE device 410 as it encounters and traverses a video outage area 1300B. Illustratively, video outage area 1300B having an ingress boundary 1320 and an egress boundary 1322 is another rendition of the outage areas described elsewhere herein, wherein the vehicle carrying wireless UE device 410 is shown at five specific locations—Locations 1 to 5—relative to the outage area. Reference numeral 1302-1 refers to the ABR buffer condition corresponding to Location 1. As the UE-carrying vehicle 410 approaches the ingress boundary 1320 (e.g., Location 1), it can be seen that the ABR buffer may contain a plurality of high bitrate media segments 1304 followed by a plurality of low bitrate segments due to varying network bandwidth and/or radio signal conditions, for example. The ABR client continues to play out available high bitrate segments 1304 (e.g., 2 Mbs segments) followed by available low bitrate segments 1306 (e.g., 500 Kbs segments) as the UE-carrying vehicle 410 enters the video outage area (e.g., Location 2), leading to gradual exhaustion of the buffer, exemplified by the status condition 1303-2. As the media content in the ABR buffer is exhausted (indicated by empty buffer storage 1308), the ABR buffer is filled with the advertisement segments 1310 (e.g., moved from a local cache into the buffer) based on the associated manifest playlist, as exemplified by the status conditions 1302-3 and 1303-4 corresponding to Locations 3 and 4 of the video outage area 1300B. When the UE-carrying vehicle 410 exits the egress boundary 1322 of the video outage area 1300B, the ABR buffer begins to fill with media segments, e.g., low bitrate segments 1306, gradually adapting to improved radio signal conditions, as illustrated by the status condition 1302-5 corresponding to Location 5.

FIG. 14 depicts an example advertisement play out process 1400 in a client-controlled environment described hereinabove. At block 1402, the wireless UE device 410 executing an ABR client application may receive or otherwise obtain a notification that it is inside an outage area. It should be appreciated that in some implementations, a portion of the video outage database may be provided to the wireless UE device so that the service logic executing thereat may perform suitable control operations with respect to automatically playing back the pre-loaded alternative content in an outage area. Responsive to the determination that the wireless UE device is within the outage area, the ABR client application executing thereon continues to play back the available media segments from the ABR buffer associated therewith (block 1404). When the ABR buffer is eventually drained (block 1406), the ABR client device saves the existing state of the next media segment to download based on the associated manifest (block 1408). A locally-generated message or notification may be provided by the ABR client to the user that the UE device is in the video outrage area and the streaming session will resume in due course, e.g., when the video outage area is exited, within a predetermined time, etc. (block 1410). Thereafter, the ABR client application commences playing back the advertisement segments filled into the ABR buffer from a local storage (block 1412).

FIG. 15 depicts an example ABR streaming session resumption process 1500 in a client-controlled environment. Similar to the features of block 1402, the wireless UE device 410 executing an ABR client application may receive or otherwise obtain a notification that it has exited an outage area and video coverage is available (block 1502). The ABR client application determines that an advertisement segment is currently being played and completes playing that current advertisement segment (blocks 1504 and 1506). Upon determining that the wireless UE device has sufficient radio signal quality, a notification may be provided to the user that video coverage is available and the streaming session is about to commence (blocks 1508 and 1510). The ABR client application resumes video session at the next segment beyond the previously played segment prior to the outage (block 1512). Thereafter, client-controlled advertisement pushing may continue as additional bandwidth becomes available (block 1514), similar to the features set forth at block 910 in FIG. 9.

FIG. 16 depicts another rendition 1600 corresponding to the wireless network environment 1100 wherein location-specific and/or user-specific advertisements are pre-cached as the wireless UE device 410 is anticipated to encounter another outage area 1618 of the network in its expected route 1601 traversing through the service area of base station 402-2. Analogous to the scenario depicted in FIG. 10, suitable request/response queries 1602/1604 with respect to the video quality location awareness server 418 and associated geo-location database 420 may be executed by the ABR stream delivery server 414 and/or associated delivery control module 416 relative to the expected route 1601, e.g., based on location, speed, heading, etc. Likewise, suitable request/response queries 1608/1610 may be effectuated for obtaining appropriate advertisement segments to be pushed to the wireless UE device 410, in a manner similar to the process set forth in FIG. 12 described above, mutatis and mutandis. The new set of advertisement segments are specific and relevant with respect to the new video outage area 1618 and may take up shorter or longer duration than the advertisement clips previously provided relative to the earlier outage area 408 (i.e., updating of locally-cached alternative content on outage area basis). As it has been determined that there is sufficient bandwidth for effectuating streaming of highest bitrate media segments, the functionality of network entity 414/416 is operative to throttle the delivery of ABR media segments at 2 Mbs via base station 402-2 as exemplified by streaming session path 1616. Further, the network entity 414/416 commences managed bandwidth push of advertisement media segment(s) and associated manifest playlist to the wireless UE device 410, via base station 402-2 as exemplified by advertisement push path 1614, with a corresponding throttled delivery rate based on the additional bandwidth amount available, similar to the functionalities set forth at block 530 of FIG. 5 and block 1228 of FIG. 12.

Figure 17:
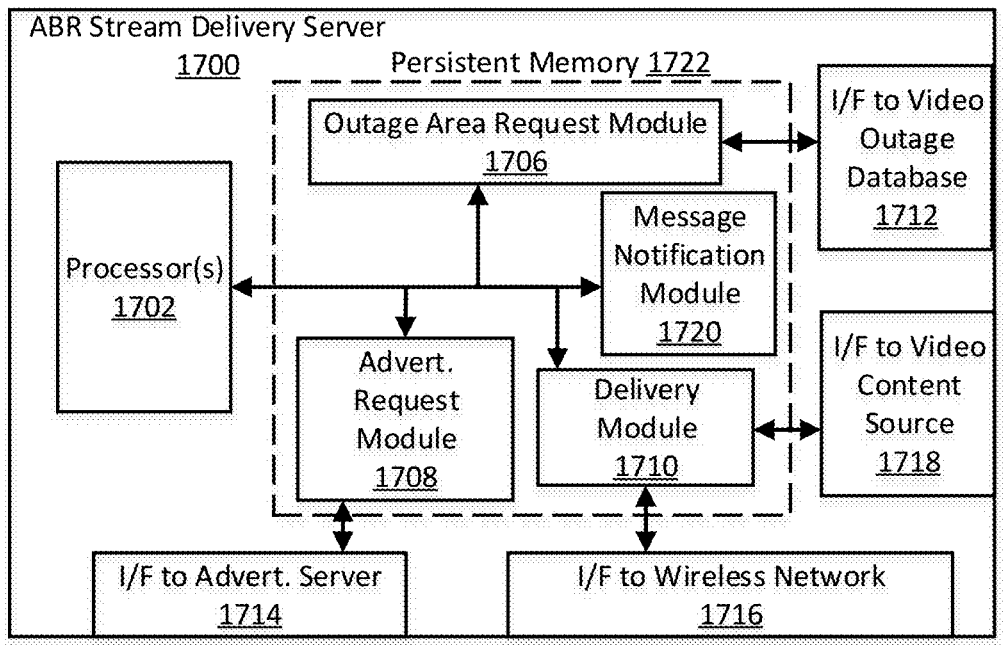
FIG. 17 depicts a block diagram of an example network element configured to execute certain aspects according to one or more embodiments of the present patent application.

FIG. 17 depicts a block diagram of an example network element 1700 configured to execute certain aspects according to one or more embodiments of the present patent application. By way of illustration, network element 1700 is exemplary of a mobile-optimized ABR stream delivery server and/or associated delivery control module described above, which may be provided as part of an RNC in certain embodiments. One or more processors 1702 may be provided for controlling a plurality of subsystems, at least a portion of which may be implemented as a combination of hardware and software modules stored as instructions or program code in suitable persistent memory 1722. An outage area request module 1706 is operative to effectuate suitable request/response mechanisms for obtaining video outage area information via an interface 1712 to appropriate video QoS-aware location servers/databases described hereinabove. An advertisement request module 1708 is operative to effectuate suitable request/response mechanisms for obtaining advertisement segments based on the video outage information and/or user demographic information, etc., via an interface 1714 to one or more advertisement servers/databases. A message notification module 1720 may optionally be included for obtaining video-encoded notification messages in a network-controlled implementation of ABR streaming redirection. A delivery control module 1710 is operative to effectuate segment encoding, user session segment delivery and advertisement push as well as appropriate bandwidth control for sessions via radio interfaces 1716 with respect to a serving wireless network. Additionally, network element 1700 may also include appropriate interfacing 1718 with respect to content sources and/or associated delivery networks.

Figure 18:
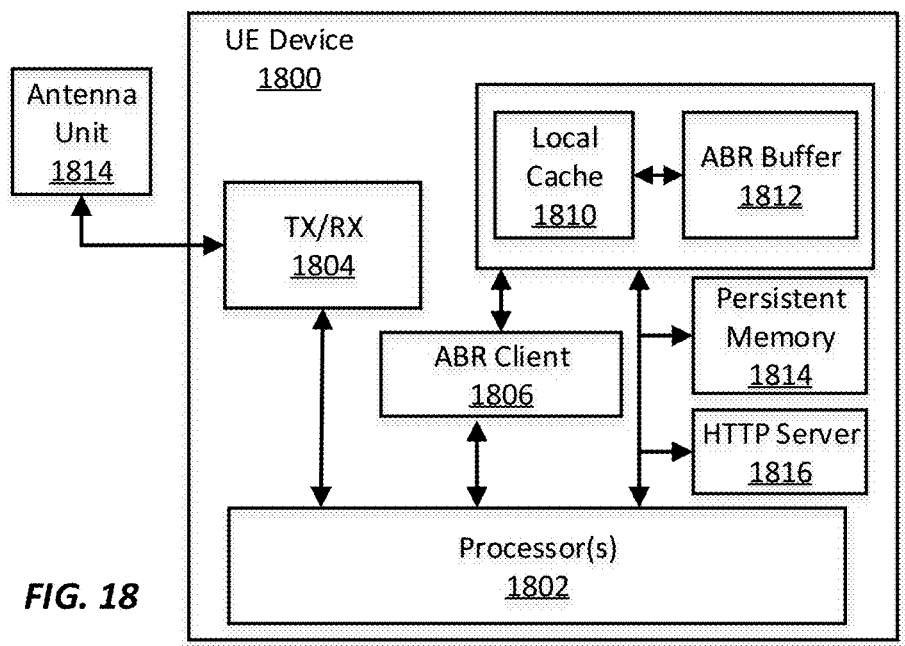
FIG. 18 depicts a block diagram of an example wireless user equipment (UE) device including an ABR client configured to execute certain aspects according to one or more embodiments of the present patent application.

FIG. 18 depicts a block diagram of an example wireless user equipment (UE) device 1800 including an ABR client 1806 configured to execute certain aspects under control of processor(s) 1802 according to one or more embodiments of the present patent application. Appropriate transceiver (Tx/Rx) circuitry 1804 coupled to an antenna unit 1814 is operative to effectuate radio communications for purposes of the present disclosure including, e.g., streaming of media, pre-caching of advertisements and notification messages, etc. in addition to other standard cellular telephony/data communications. The ABR client 1806 is operative to play out segments stored in an ABR buffer 1812, which may be filled with preloaded content from a local cache 1810 in certain embodiments described above. An HTTP server 1816 may be provided in certain embodiments for facilitating internal referencing of manifest URLs corresponding to locally cached content. In one implementation, the functionality of HTTP server 1816 may be implemented as executable code portion stored in a persistent memory module 1814. Additionally, the persistent memory module 1814 may also comprise various code portions for effectuating at least some of the processes described hereinabove.

Based upon the foregoing Detailed Description, it should be appreciated that one or more embodiments of the present disclosure can be advantageously implemented in a number of wireless ABR streaming environments that may include legacy client applications and/or custom client applications. By detecting potential video outage areas in a wireless network environment, better network service behavior can be achieved for any location-based service involving video streaming, for example.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. For example, at least some of the nodes shown in the wireless streaming network environments of FIG. 4 and FIG. 11 such as the ABR stream delivery server and/or associated delivery control module, video-encoded message generation system, video outage area location server and associated database(s), for example, may be integrated or otherwise co-located in different combinations, including as part of an RNC node. Finally, other blocks may be added/inserted between the blocks that are illustrated. Moreover, although some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An adaptive bitrate (ABR) stream delivery server for facilitating ABR streaming sessions in a wireless radio network environment, comprising:
    one or more processors;
    an outage area request module operating under control of the one or more processors and configured to request anticipated video outage areas with respect to a wireless user equipment (UE) device disposed in the wireless radio network environment, the anticipated video outage areas determined responsive to issuing a query to a geo-location database having a plurality of outage locations learned from monitoring minimum bitrate conditions required for streaming adaptive bitrate media content in the wireless radio network environment, the query including the wireless UE device's current location, speed and an estimated direction of travel in the wireless radio network environment;
    an advertisement request module operating under control of the one or more processors for obtaining advertisement content from an advertisement server; and
    a delivery module operating under control of the one or more processors and configured to:
        effectuate delivery of ABR media segments of a media program encoded at different bitrates as multiple bitrate representations to the wireless UE device in an ABR streaming session when the wireless UE device is not in a video outage area, the ABR media segments having particular bitrate representations requested by the wireless UE device based on a manifest file identifying a plurality of bitrates used in encoding the media program into the multiple bitrate representations;
        effectuate delivery of the advertisement content to the wireless UE device for storing in a cache of the wireless UE device when the wireless UE device is not in a video outage area;
        suspend the ABR streaming session with the wireless UE device in response to determining that the wireless UE device is entering a video outage area;
        provide manifest files, to the wireless UE device, containing local storage file path location pointers to the advertisement content stored in the cache of the wireless UE device; and
        after suspending the ABR streaming session, instruct the wireless UE device to commence playback of the advertisement content stored in the cache of the wireless UE device.

2. The ABR stream delivery server as recited in claim 1, further including a notification module operating in conjunction with the delivery module for facilitating delivery of a video-encoded notification message to the wireless UE device, upon determining that the wireless UE device is in the video outage area, that the ABR streaming session to the wireless UE device is being suspended and one or more advertisements will be played back while the wireless UE device is in the video outage area.

3. The ABR stream delivery server as recited in claim 2, wherein the video-encoded notification message further includes an estimation of outage time associated with the video outage area.

4. The ABR stream delivery server as recited in claim 2, wherein the notification module is further operative for facilitating delivery of another video-encoded notification message to the wireless UE device, upon determining that the wireless UE device is exiting the video outage area, that the ABR streaming session to the wireless UE device is being resumed.

5. The ABR stream delivery server as recited in claim 1, further including an interface for communicating with one or more base stations disposed in the wireless radio network environment.

6. The ABR stream delivery server as recited in claim 1, wherein the advertisement content is relevant with respect to each of the anticipated video outage areas in the estimated direction of travel of the wireless UE device.

7. The ABR stream delivery server as recited in claim 1, wherein the delivery module is further configured to deliver the advertisement content at a delivery rate based on an amount by which an overall bandwidth of the wireless UE device exceeds a highest bitrate indicated in the manifest file associated with the ABR streaming session.

8. The ABR stream delivery server as recited in claim 2, wherein the one or more advertisements are based on demographic information of a user of the wireless UE device.

9. A method operating at an adaptive bitrate (ABR) stream delivery server for facilitating ABR streaming sessions in a wireless radio network environment, the method comprising:
- determining that a wireless user equipment (UE) device disposed in the wireless radio network environment is traversing a path likely to be encountered by one or more video outage areas;
- issuing a query to a geo-location database having a plurality of outage locations learned from monitoring minimum bitrate conditions required for streaming adaptive bitrate media content in the wireless radio network environment, the query including the wireless UE device's current location, speed and an estimated direction of travel in the wireless radio network environment;
- determining that the wireless UE device is engaged in an ABR streaming session for requesting ABR media segments of a media program encoded at different bitrates as multiple bitrate representations, wherein a manifest file associated with the ABR streaming session identifies a plurality of bitrates used in encoding the media program into multiple bitrate representations;
- obtaining advertisement content from an advertisement server;
- effectuating delivery of the advertisement content to the wireless UE device for storing in a cache of the wireless UE device when the wireless UE device is not in a video outage area;
- suspending the ABR streaming session with the wireless UE device in response to determining that the wireless UE device is entering a video outage area;
- providing manifest files, to the wireless UE device, containing local storage file path location pointers to the advertisement content stored in the cache of the wireless UE device; and
- after suspending the ABR streaming session, instructing the wireless UE device to commence playback of the advertisement content stored in the cache of the wireless UE device.

10. The method as recited in claim 9, further comprising:
- determining that the wireless UE device has entered a video outage area; and
- responsive to the determining, delivering a video-encoded notification message to the wireless UE device that the ABR streaming session is being suspended and one or more advertisements will be played back while the wireless UE device is in the video outage area.

11. The method as recited in claim 10, wherein the one or more advertisements are based on demographic information of a user of the wireless UE device.

12. The method as recited in claim 9, wherein the advertisement content is relevant with respect to each of the anticipated video outage areas in the estimated direction of travel of the wireless UE device.

13. The method as recited in claim 9, wherein the advertisement content is delivered at a delivery rate based on an amount by which an overall bandwidth of the wireless UE device exceeds a highest bitrate indicated in the manifest file associated with the ABR streaming session.

14. The method as recited in claim 10, further comprising:
- determining that the wireless UE device is exiting the video outage area; and
- responsive to the determining, delivering another video-encoded notification message to the wireless UE device that the ABR streaming session to the wireless UE device is being resumed.

15. A non-transitory computer-readable medium containing instructions stored thereon which, when executed by one or more processors of an adaptive bitrate (ABR) stream delivery server, facilitate ABR streaming sessions in a wireless radio network environment, the non-transitory computer-readable medium comprising:
- a code portion for determining that a wireless user equipment (UE) device disposed in the wireless radio network environment is traversing a path likely to be encountered by one or more video outage areas;
- a code portion for issuing a query to a geo-location database having a plurality of outage locations learned from monitoring minimum bitrate conditions required for streaming adaptive bitrate media content in the wireless radio network environment, the query including the wireless UE device's current location, speed and an estimated direction of travel in the wireless radio network environment;
- a code portion for determining that the wireless UE device is engaged in an ABR streaming session for requesting ABR media segments of a media program encoded at different bitrates as multiple bitrate representations, wherein a manifest file associated with the ABR streaming session identifies a plurality of bitrates used in encoding the media program into multiple bitrate representations;
- a code portion for obtaining advertisement content from an advertisement server;
- a code portion for effectuating delivery of the advertisement content to the wireless UE device for storing in a cache of the wireless UE device when the wireless UE device is not in a video outage area;
- a code portion for suspending the ABR streaming session with the wireless UE device in response to determining that the wireless UE device is entering a video outage area;
- a code portion for providing manifest files, to the wireless UE device, containing local storage file path location pointers to the advertisement content stored in the cache of the wireless UE device; and
- a code portion operative, after suspending the ABR streaming session, for instructing the wireless UE device to commence playback of the advertisement content stored in the cache of the wireless UE device.

16. The non-transitory computer-readable medium as recited in claim 15, further comprising a code portion, responsive to determining that the wireless UE device has entered a video outage area, for delivering a video-encoded notification message to the wireless UE device that the ABR streaming session is being suspended and one or more advertisements will be played back while the wireless UE device is in the video outage area.

17. The non-transitory computer-readable medium as recited in claim 16, wherein the one or more advertisements are based on demographic information of a user of the wireless UE device.

18. The non-transitory computer-readable medium as recited in claim 15, wherein the advertisement content is relevant with respect to each of the anticipated video outage areas in the estimated direction of travel of the wireless UE device.

19. The non-transitory computer-readable medium as recited in claim 15, wherein the advertisement content is delivered at a delivery rate based on an amount by which an overall bandwidth of the wireless UE device exceeds a highest bitrate indicated in the manifest file associated with the ABR streaming session.

20. The non-transitory computer-readable medium as recited in claim 16, further comprising a code portion, responsive to determining that the wireless UE device is exiting the video outage area, for delivering another video-encoded notification message to the wireless UE device that the ABR streaming session to the wireless UE device is being resumed.

\* \* \* \* \*